(12) United States Patent
Yamane

(10) Patent No.: US 11,353,564 B2
(45) Date of Patent: Jun. 7, 2022

(54) DISTURBANCE LIGHT IDENTIFYING APPARATUS, DISTURBANCE LIGHT SEPARATING APPARATUS, DISTURBANCE LIGHT IDENTIFYING METHOD, AND DISTURBANCE LIGHT SEPARATING METHOD

(71) Applicant: Tamron Co., Ltd., Saitama (JP)

(72) Inventor: Kodai Yamane, Saitama (JP)

(73) Assignee: Tamron Co., Ltd., Saitama (JP)

( * ) Notice: Subject to any disclaimer, the term of this patent is extended or adjusted under 35 U.S.C. 154(b) by 592 days.

(21) Appl. No.: 16/222,200

(22) Filed: Dec. 17, 2018

(65) Prior Publication Data

US 2019/0242984 A1 Aug. 8, 2019

(30) Foreign Application Priority Data

Feb. 5, 2018 (JP) .............................. JP2018-018336

(51) Int. Cl.
| | |
|---|---|
| *G01S 7/487* | (2006.01) |
| *G01S 17/10* | (2020.01) |
| *G01S 7/483* | (2006.01) |
| *G03B 7/00* | (2021.01) |
| *H04N 5/225* | (2006.01) |
| *H04N 5/217* | (2011.01) |
| *H04N 5/21* | (2006.01) |

(52) U.S. Cl.
CPC ............ *G01S 7/4876* (2013.01); *G01S 7/483* (2013.01); *G01S 17/10* (2013.01); *G03B 7/00* (2013.01); *H04N 5/217* (2013.01); *H04N 5/2254* (2013.01); *H04N 5/211* (2013.01)

(58) Field of Classification Search
CPC ........ G01S 7/4876; G01S 17/10; G01S 7/483; G03B 7/00; G03B 43/00; H04N 5/211; H04N 5/2254; H04N 5/217
USPC ........................................................ 356/4.01
See application file for complete search history.

(56) References Cited

U.S. PATENT DOCUMENTS

| | | | |
|---|---|---|---|
| 2002/0186304 A1 | 12/2002 | Kono et al. | |
| 2012/0321203 A1* | 12/2012 | Yamashita | ............... H04N 1/58 382/224 |

FOREIGN PATENT DOCUMENTS

| | | |
|---|---|---|
| JP | 200081556 A | 3/2000 |
| JP | 2002318104 A | 10/2002 |
| JP | 2006172772 A | 6/2006 |
| JP | 2006313815 A | 11/2006 |
| JP | 2009152921 A | 7/2009 |
| JP | 2014178244 A | 9/2014 |

* cited by examiner

*Primary Examiner* — Daniel L Murphy
(74) *Attorney, Agent, or Firm* — The Webb Law Firm

(57) ABSTRACT

Disclosed are a disturbance light identifying apparatus, a disturbance light separating apparatus, a disturbance light identifying method, and a disturbance light separating method capable of precisely identifying whether or not light exiting an optical system contains a disturbance light component or capable of separating such a disturbance light component by using a simple technique. Provided are: a modulated light irradiation unit that irradiates an optical system 1 with modulated light; a light receiving unit that receives light exiting the optical system 1 in response to an incidence of the modulated light from the modulated light irradiation unit; and a controlling unit that controls the modulated light irradiation unit and the light receiving unit.

14 Claims, 11 Drawing Sheets

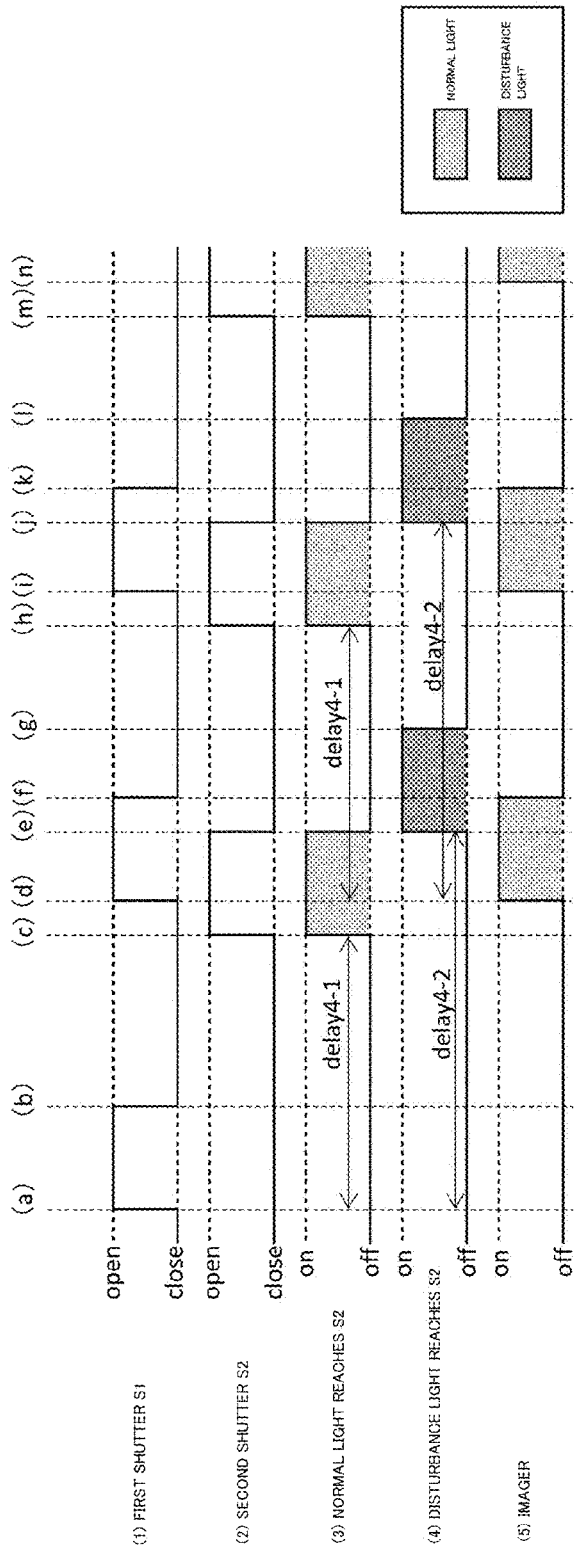

DISTURBANCE LIGHT IDENTIFYING APPARATUS, DISTURBANCE LIGHT SEPARATING APPARATUS, DISTURBANCE LIGHT IDENTIFYING METHOD, AND DISTURBANCE LIGHT SEPARATING METHOD

CROSS-REFERENCE TO RELATED APPLICATION

This application claims priority to Japanese Patent Application No. 2018-018336 filed Feb. 5, 2018, the disclosure of which is hereby incorporated in its entirety by reference.

BACKGROUND OF THE INVENTION

Field of the Invention

The present invention is related to a disturbance light identifying apparatus, a disturbance light separating apparatus, a disturbance light identifying method, and a disturbance light separating method used for identifying the presence/absence of, or for separation of, disturbance light such as a flare or a ghost occurring in an optical system.

Description of the Related Art

In recent years, imaging apparatuses that employ solid image sensors have become popular. For instance, examples of imaging apparatuses that have become popular include not only imaging apparatuses that are portable for users such as single-lens reflex cameras, mirrorless single-lens cameras, digital still cameras, and the like, but also installed and fixed imaging apparatuses such as monitoring-purpose imaging apparatuses that are used while being installed and fixed on a building or the like, in-vehicle imaging apparatuses that are used while being installed and fixed in a mobile member like a vehicle, among others.

Generally speaking, optical systems of imaging apparatuses are each composed of a plurality of lenses and housed in a lens barrel. A part of incident light on such an optical system is either reflected or scattered by either an optical surface of a lens or the inner wall surface of the lens barrel. Although the optical surface and the inner wall surface of the lens barrel undergo an anti-reflection coating process, it is not always possible to pass or absorb all the incident light on the optical surface and the inner wall surface of the lens barrel. For this reason, when powerful light from the sun or a light source enters the optical system, the light that is repeatedly reflected or scattered on the inside of the optical system or on the inside of the lens barrel reaches an imaging plane and may appear in a captured image as a flare or a ghost. For example, when a user images the sky at night by using an imaging apparatus, if a light source such as a street lamp is present in the vicinity of the imaging location, a ghost caused by the street lamp or the like may appears in the captured image. The captured image in which the ghost appears brighter than the stars in the night sky is not what the user who took the image had intended to take. Further, when an image is imaged with so-called backlight, the entirety of the captured image may look white due to a flare. In that situation, the contrast of the imaged object may be lowered, and the captured image as a whole gives an impression of being blurry.

Further, when vehicles traveling on a road are imaged during the night time or the like by using a monitoring-purpose imaging apparatus for the purpose of traffic monitoring, a ghost due to the headlights may appear in the captured image. It is not possible to do traffic monitoring sufficiently when the numbers on the license plates are illegible because of the ghost caused by the headlights. In addition, Advanced Driver Assistance Systems (ADAS) such as automatic brakes are getting popular in recent years. In an ADAS system, an in-vehicle imaging apparatus is used as a sensing camera, so as to detect obstacles or the like, for example. However, when the light from the headlights of an oncoming vehicle is radiated onto the in-vehicle imaging apparatus, a ghost and/or a flare may occur, which may make it difficult to detect obstacles or the like.

As explained above, whatever the imaging apparatuses are used for any purpose, the occurrence of a ghost or a flare is considered as an unwanted phenomenon.

To cope with this situation, a method has conventionally been used (see Patent Literature 1, for example) by which a flare cutter mechanism having a variable aperture diameter is arranged in an optical system and inadvertently reflected or scattered light (hereinafter "disturbance light") in the optical system (including the inside of a lens barrel) is eliminated by adjusting the position and/or the aperture diameter of the flare cutter mechanism before the disturbance light reaches an imaging plane. Further, another method has also been used by which a flare component caused by disturbance light is eliminated from an obtained object image, by way of software (see Patent Literature 2, for example).

CITATION LIST

Patent Literature

[Patent Literature 1] Japanese Patent Laid-Open No. 2000-81556
[Patent Literature 2] Japanese Patent Laid-Open No. 2009-152921

SUMMARY OF THE INVENTION

Technical Problem

Incidentally, in inspection processes, it is common practice to radiate light onto an optical system and to identify the presence/absence of disturbance light, on the basis of the light amount of disturbance light that has reached an imaging plane. According to this method, however, it may not be possible, in some situations, to precisely identify the presence/absence of disturbance light, depending on how the light is applied and how much light is applied to the optical system subject to the inspection. Further, causes of disturbance light are extremely complicated. For example, disturbance light may be caused by a small scratch or dirt on the surface of an optical surface or may be caused due to the design of the optical system. However, even when this method is able to precisely identify the disturbance light, it is still difficult to identify or estimate the cause of the disturbance light by using this method. For this reason, even when conventional methods such as those presented in Patent Literature 1 and Patent Literature 2 are applied, it is still not possible to sufficiently eliminate the disturbance light occurring in the optical system.

It is an object of the present invention to provide a disturbance light identifying apparatus and a disturbance light identifying method capable of precisely identifying whether or not light exiting an optical system contains a disturbance light component and capable of estimating a causal plane of the disturbance light by using a simple technique, or a disturbance light separating apparatus or a disturbance light separating method capable of separating the disturbance light component from the light exiting an optical system subject to an inspection by using a simple technique.

Solution to Problem

To achieve the abovementioned object, a disturbance light identifying apparatus according to the present invention includes: a modulated light irradiation unit that irradiates an optical system with modulated light; a light receiving unit that receives light exiting the optical system in response to an incidence of the modulated light from the modulated light irradiation unit; and a controlling unit that controls the modulated light irradiation unit and the light receiving unit. While a light beam incident on the light receiving unit after traveling through an optical path exceeding a reference distance determined on a basis of a designed optical path length of the optical system is defined as a disturbance light component, the controlling unit identifies whether or not the light exiting the optical system contains the disturbance light component, on a basis of a light beam traveling distance obtained from the light exiting the optical system.

Further, to achieve the abovementioned object, a disturbance light separating apparatus according to the present invention includes: a modulated light irradiation unit that irradiates an optical system with modulated light; a light receiving unit that receives light exiting the optical system in response to an incidence of the modulated light from the modulated light irradiation unit; and a controlling unit that controls the modulated light irradiation unit and the light receiving unit. While a light beam incident on the light receiving unit after traveling through an optical path exceeding a reference distance determined on a basis of a designed optical path length of the optical system is defined as a disturbance light component, the controlling unit generates disturbance light component separation information used for separating the disturbance light component from the light exiting the optical system, on a basis of a light beam traveling distance obtained from the light exiting the optical system.

To achieve the abovementioned object, a disturbance light separating apparatus according to the present invention includes: a modulated light irradiation unit that irradiates an optical system with modulated light; a light receiving unit that receives light exiting the optical system in response to an incidence of the modulated light from the modulated light irradiation unit; a shutter called "second shutter" for receiving only normal light provided between the optical system and the light receiving unit; and a controlling unit that controls the modulated light irradiation unit, the light receiving unit, and the second shutter. While a light beam incident on to the light receiving unit after traveling through an optical path exceeding a reference distance determined on a basis of a designed optical path length of the optical system is defined as a disturbance light component, the controlling unit controls opening and closing of the second shutter in such a manner that the second shutter is open only during such a time period when the disturbance light component out of the light exiting the optical system does not reach the second shutter.

To achieve the abovementioned object, a disturbance light identifying method according to the present invention includes: a step of irradiating an optical system with modulated light; a step of obtaining information about a light beam traveling distance from light exiting the optical system in response to an incidence of the modulated light; and a step of identifying, while a light beam incident on a light receiving unit after traveling through an optical path exceeding a reference distance determined on a basis of a designed optical path length of the optical system is defined as a disturbance light component, whether or not the light exiting the optical system contains the disturbance light component, on a basis of the light beam traveling distance obtained from the light exiting the optical system.

To achieve the abovementioned object, a disturbance light separating method according to the present invention includes: a step of irradiating an optical system with modulated light; a step of obtaining information about a light beam traveling distance from light exiting the optical system in response to an incidence of the modulated light; and a step of generating disturbance light component separation information, while a light beam incident on a light receiving unit after traveling through an optical path exceeding a reference distance determined on a basis of a designed optical path length of the optical system is defined as a disturbance light component, the disturbance light component separation information being used for separating the disturbance light component from the light exiting the optical system, on a basis of the light beam traveling distance obtained from the light exiting the optical system.

Advantageous Effects of Invention

According to the present invention, it is possible to provide the disturbance light identifying apparatus and the disturbance light identifying method capable of precisely detecting whether or not the light exiting the optical system subject to an inspection contains a disturbance light component and capable of estimating a causal plane for the disturbance light by using the simple technique, or the disturbance light separating apparatus or the disturbance light separating method capable of separating a disturbance light component included the light exiting the optical system subject to the inspection by using the simple technique.

BRIEF DESCRIPTION OF THE DRAWINGS

FIG. 11 is a timing chart showing an example of an operation performed by the disturbance light separating apparatus according to the fourth embodiment.

DETAILED DESCRIPTION OF THE PREFERRED EMBODIMENTS

The following describes first to fourth embodiments of a disturbance light identifying apparatus, a disturbance light separating apparatus, a disturbance light identifying method, and a disturbance light separating method according to the present invention. The embodiments described below merely represent exemplary modes of the present invention. Possible embodiments of the present invention are not limited to the embodiments described below. Needless to say, various modifications may be applied thereto as appropriate, without departing from the scope of the present invention.

Before describing the embodiments, an optical system, normal light, and disturbance light will be explained.

In the present invention, the term "optical system" refers to a system that realizes an image forming function or the like by combining together one or more optical elements. Specific examples of the optical system include image forming optical systems such as imaging lenses, microscopes, telescopes, and endoscopes, as well as illumination optical systems, projection optical systems, reflection optical systems, scanning optical systems, and the like.

The disturbance light identifying apparatus according to the present invention is capable of identifying whether or not disturbance light is occurring in any of these optical systems. Further, the disturbance light separating apparatus according to the present invention is capable of separating disturbance light occurring in any of these optical systems. Note that, however, the disturbance light to be identified and/or separated in the present invention is compliant with the definition explained later.

Figure 1B:
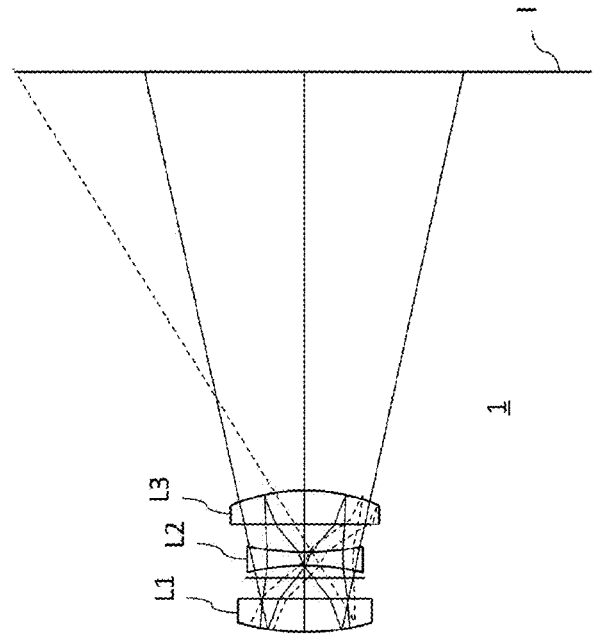
FIGS. 1(a) and 1(b) are drawings for explaining disturbance light discussed in the present invention.
Figure 1A:
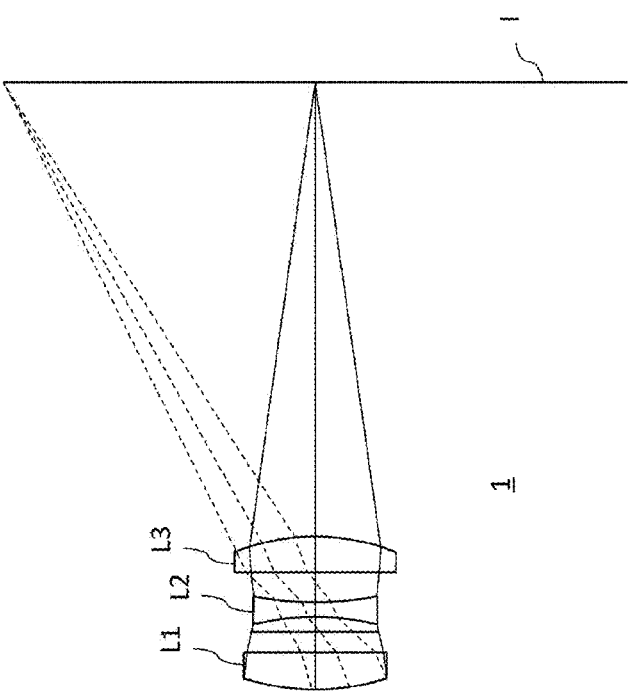

Next, normal light and disturbance light will be explained, with reference to FIGS. 1(a) and 1(b). An optical system 1 (an image forming optical system) shown in FIGS. 1(a) and 1(b) is an imaging lens. The optical system 1 includes a first lens L1 having positive refractive power, a second lens L2 having negative refractive power, and a third lens L3 having positive refractive power that are arranged in the stated order from the object side. These lenses are disposed on the inside of a lens barrel (not shown in the drawings).

FIG. 1(a) shows optical paths of an axial light beam and of light beams for a maximum image height. According to Fermat's principal, light incident on the optical system 1 travels through such an optical path that makes the optical distance shortest in the optical system 1, and exits the optical system 1. Ideally, the light (the incident light) that is incident on the optical system 1 travels through a designed optical path in the optical system 1, exits the optical system 1, and enters to an image plane I. The word "ideally" denotes situations in which the optical elements constructing the optical system 1 are free from defects such as scratches or dirt and in which no reflection or scattering occurs on the surfaces of the optical elements or the inner wall surface of the lens barrel, or the like.

In contrast, there may be some situations in which, within the optical system 1, a part of the incident light may be reflected on an optical surface of a lens, the inner wall surface of the lens barrel, or the like. In the example in FIG. 1(b), (a part of) the light incident on the optical system 1 is reflected on the image side surface of the third lens L3 and sequentially passes through the second lens L2 and the first lens L1. The light that has reached the object side surface of the first lens L1 is again reflected on the object side surface of the first lens L1. The reflected light then sequentially passes through the second lens L2 and the third lens L3, and exits from the image side surface of the third lens L3. In this manner, the part of the light incident on the optical system 1 travels through the optical path different from the designed optical path in the optical system 1, and enters the image plane I. Examples of such light beams incident on the image plane I after traveling through an optical path different from the designed optical path include, not only disturbance light (a disturbance light component), but also noise components such as background noise and shot noise.

In the embodiments described herein, a reference distance is determined in advance on the basis of a designed optical path length, as a reference value used for identifying whether or not light in question is disturbance light. A light beam that enters the image plane I (a light receiving unit) after traveling through an optical path exceeding the reference distance shall be referred to as disturbance light (a disturbance light component). Other light beams shall be referred to as normal light, for the sake of convenience. In this situation, the "reference distance determined on the basis of the designed optical path length" may be equal distance to the designed optical path length or may be different distance from the designed optical path length. In consideration of manufacturing errors in the optical system 1 and various types of noise described above, it is desirable to arrange the reference distance to be longer or shorter by a predetermined distance than the designed optical path length by a specific amount. Further, "exceeding the reference distance" indicates that the light beam traveling distance may be longer or is shorter than the reference distance. However, it should be defined in advance what value the "reference distance" has in relation to the designed optical path length and whether "exceeding the reference distance" means being longer or being shorter than the reference distance. In the embodiments described below, the imaging lens shown in FIGS. 1(a) and 1(b) shall be used as an example of the optical system 1, while the "reference distance" is a distance longer than the designed optical path length by a predetermined distance, and "exceeding the reference distance" means being longer than the reference distance. Further, among light beams incident on the image plane I, light beams each having a traveling distance equal to or shorter than the reference distance, i.e., the light beams other than disturbance light, shall be treated as normal light in the embodiments described below.

1. First Embodiment

1-1. Construction

A first embodiment of the disturbance light identifying apparatus and the disturbance light separating apparatus according to the present invention will be explained. In the first embodiment, the disturbance light identifying apparatus and the disturbance light separating apparatus are integrally constructed as a disturbance light identifying and separating apparatus 100 shown in FIG. 2. Accordingly, in the following sections, a construction of the disturbance light identifying and separating apparatus 100 will be explained.

Figure 2:
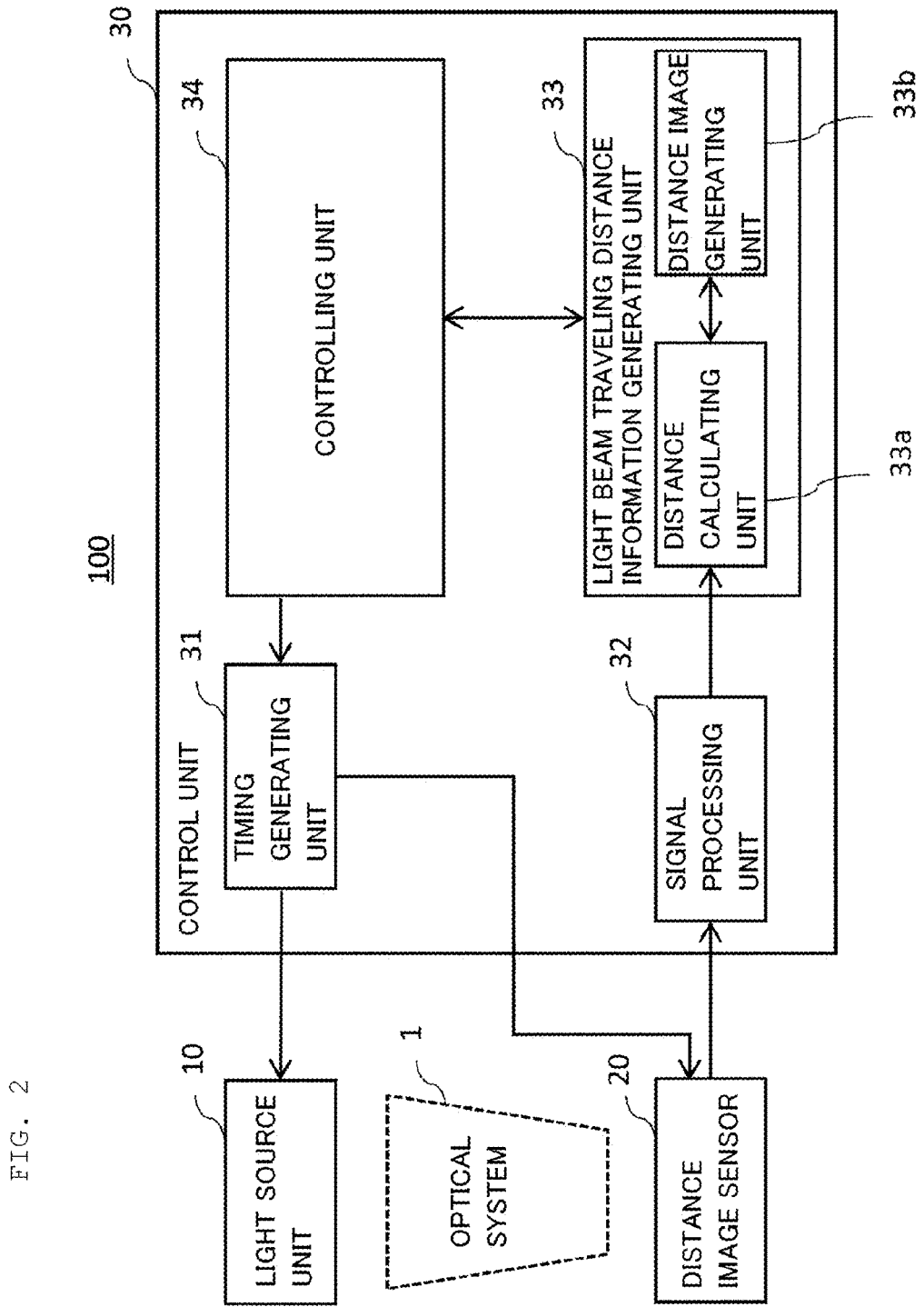
FIG. 2 is a block diagram showing an exemplary construction of a disturbance light identifying and separating apparatus according to a first embodiment.

As shown in FIG. 2, the disturbance light identifying and separating apparatus 100 is equipped with a light source unit 10 (a modulated light irradiation unit), a distance image sensor 20 (a light receiving unit), and a control unit 30 (a controlling unit). In the first embodiment, under control of the control unit 30, pulse light (modulated light) is irradiated the optical system 1 with the light source unit 10. Further, when the pulse light irradiated from the light source unit 10 enters the optical system 1, the light exiting the optical system 1 in response thereto (response light of the optical system 1) is received by the distance image sensor 20. In the following sections, the light exiting the optical system 1 will be referred to as "exiting light from the optical system 1". On the basis of the exiting light from the optical system 1, the control unit 30 obtains information about a light beam traveling distance by performing a calculation or the like. After that, on the basis of the information about the light beam traveling distance, the control unit 30 identifies whether or not the exiting light from the optical system 1 contains disturbance light and further generates disturbance light separation information used for separating the disturbance light from the exiting light from the optical system 1. As schematically shown in FIG. 2, the optical system 1 is arranged between the light source unit 10 and the distance image sensor 20, and the arrangements of these elements are determined so that the pulse light irradiated from the light source unit 10 enters the optical system 1 and so that the exiting light that exits the optical system 1 in response to an incidence of the pulse light further enters the distance image sensor 20. Further, it is assumed that the optical system 1 is housed in a lens barrel and that the distance image sensor 20 is constructed in such a manner that no light other than the exiting light from the optical system 1 enters the distance image sensor 20. In the following sections, constructions of the various functional units will be explained.

(1) The Light Source Unit 10

In the present embodiment, the light source unit 10 is a pulse light source and may be constructed, for example, by using a light emitting element and a drive circuit or the like that drives the light emitting element. As the light emitting element, for example, a light emitting diode or a laser diode that emits a light beam having a specific wavelength may be used. The drive circuit receives a light emission control signal transmitted thereto from the control unit 30 and causes the light emitting element to emit light according to the light emission control signal. In the present embodiment, the light source unit 10 intermittently emits a light beam having the specific wavelength, with a light emission pulse width in the range of a few nano-seconds to several tens of nano-seconds, for example. Further, the light emission pulse width may be set to an appropriate value as necessary, in accordance with the light beam traveling distance subject to an examination, an electric charge transfer clock width used by the distance image sensor 20, or the like. In the present embodiment, it is assumed that the light source unit 10 irradiates the optical system 1 with a pulse wave (a rectangular wave), for the sake of convenience in the explanation. However, in the present invention, the waveform of the light irradiated from the light source unit 10 (the modulated light irradiation unit) onto the optical system 1 is not limited to that of a pulse wave and may be that of a sine wave or the like. In other words, the specific construction of the light source unit 10 is not particularly limited, as long as the light source unit 10 is a light source that is equipped with a light emitting element, a drive circuit (a modulation circuit) to modulate the amplitude, the frequency, the phase, etc. of the light emitted by the light emitting element, and the like, and that irradiates with light (modulated light) of which the light amount changes in relation to time. Even when the light source unit 10 irradiates the optical system 1 with other types of modulated light (e.g., light having a sine wave), it is possible to achieve the same or similar functions by using a construction similar to that of the disturbance light identifying and separating apparatus 100 described below.

Next, the wavelength of the light irradiated from the light source unit 10 onto the optical system 1 will be explained. First, as a premise, the wavelength of the light irradiated from the light source unit 10 is a wavelength for which the distance image sensor 20 has light receiving sensitivity. The reason is that it would be impossible to calculate the light beam traveling distance of the incident light in the optical system 1, if the distance image sensor 20 were unable to detect the light exiting the optical system 1.

Secondly, it is desirable that the light irradiated from the light source unit 10 onto the optical system 1 has a wavelength within the wavelength region used by the optical system 1. Refraction of light is dependent on the wavelength thereof. Even if such light being in a wavelength region different from the wavelength region used by the optical system 1 were irradiated onto the optical system 1 to identify whether or not the exiting light from the optical system 1 contains a disturbance light component, it would be impossible to precisely identify whether or not disturbance light occurs in the wavelength region used by the optical system 1. The reason is that the optical path of the incident light within the optical system 1 varies depending on the wavelength of the incident light. Accordingly, when an optical system composed of a plurality of optical elements such as imaging lenses is used as the optical system 1, it is particularly desirable when the light irradiated from the light source unit 10 onto the optical system 1 has a wavelength within the wavelength region used by the optical system 1.

As long as the abovementioned conditions are satisfied, the wavelength of the light irradiated from the light source unit 10 onto the optical system 1 is not particularly limited and may have an arbitrary wavelength in an arbitrary wavelength region such as a visible light wavelength region (380 nm to 750 nm), a near infrared wavelength region (0.75 μm to 1.4 μm), an infrared wavelength region (1.4 μm to 15 μm), a far infrared wavelength region (15 μm to 1,000 μm) or the like mentioned above.

(2) The Distance Image Sensor 20

The distance image sensor 20 receives the exiting light from the optical sensor 1. In the present embodiment, the distance image sensor 20 is equipped with a plurality of light receiving elements (photodiodes or the like; not shown in the drawings) provided on a light receiving plane (the image plane I). The distance image sensor 20 has a plurality of pixels. Each of the pixels includes at least one light receiving element. When having received the exiting light from the optical system 1, the distance image sensor 20 stores therein an electric charge generated at the time of the light reception, converts the electric charge into signal voltage, and outputs the signal voltage as a light reception signal (a response signal). On the basis of the light reception signal output from the distance image sensor 20, the control unit 30 calculates the light beam traveling distance of the received light for each of the pixels and further generates distance image data. As explained above, the distance image sensor 20 is required to have certain light receiving sensitivity for the wavelength of the light emitted by the light source unit 10.

In the present embodiment, a Charge-Coupled Device (CCD) sensor using a Time of Flight (TOF) method is used as the distance image sensor 20. Generally speaking, the distance image sensor 20 is used for obtaining a distance image of object. The CCD sensor using the TOF method is equipped with a plurality of pixels (not shown in the drawings) arranged two-dimensionally. The light receiving element constructing each of the pixels is equipped with two or more electric charge storing units (not shown in the drawings). The distance image sensor 20 stores the electric charge generated at the time of receiving the light for each of the light receiving elements in one of the electric charge storing units or one or more of the electric charge storing units under the control of the control unit 30. There is no particular limitation for the number of electric charge storing units provided for each of the light receiving elements and with what timing the electric charges are distributed among which electric charge storing units. However, in the following sections, the present embodiment will be explained on the assumption that each of the light receiving elements is equipped with a first electric charge storing unit and a second electric charge storing unit.

When an imaging process is performed one time (for one frame), the distance image sensor 20 is optically exposed during a specific exposure time period. During that time period, the light source unit 10 emits light one or more times with the specific pulse width, so that the distance image sensor 20 intermittently receives light. Further, the electric charges that are generated when the exiting light from the optical system 1 is received are stored as being alternately distributed between the first electric charge storing unit and the second electric charge storing unit. When the predetermined exposure time period has elapsed, the signal voltage levels corresponding to the electric charges stored in the first electric charge storing unit and the second electric charge storing unit are output to the control unit 30 as a first light reception signal and a second light reception signal, respectively.

In the present embodiment, as long as the distance image sensor 20 is a sensor capable of calculating the traveling distance of the light received on the light receiving plane, the distance image sensor 20 does not necessarily have to employ the CCD sensor using the TOF method as described above, but may employ a Single Photon Avalanche Diode (SPAD). In that situation, between when the CCD sensor using the TOF method is employed as the distance image sensor 20 and when the SPAD is employed as the distance image sensor 20, there are various differences in minor details in the control over the distance image sensor 20 exercised by the control unit 30. However, it is acceptable to employ any element as the distance image sensor 20 constructing the light receiving unit, as long as it is possible to obtain the information about the light beam traveling distance within the optical system 1, as a result of the distance image sensor 20 receiving the exiting light from the optical system 1.

(3) The Control Unit 30

In the functional construction thereof, the control unit 30 is equipped with a timing generating unit 31, a signal processing unit 32, a light beam traveling distance information generating unit 33, and a controlling unit 34 that are described below. The control unit 30 may be constructed by combining together, for example, an Analog Front End (AFE) element, an Analog/Digital (A/D) converting unit, a Digital Signal Processor (DSP), and an Application Specific Integrated Circuit (ASIC), or a Field Programmable Gate Array (FPGA), and the like. Further, as a computing device, a microprocessor (MPU) equipped with a CPU, a RAM, a ROM, and the like may be used. However, as for the physical construction of the control unit 30, the specific circuit construction thereof is not particularly limited as long as it is possible to realize the functions of the functional units as described below.

(i) The Timing Generating Unit 31

The timing generating unit 31 generates the abovementioned light emission control signal and outputs the generated light emission control signal to the light source unit 10. Further, the timing generating unit 31 generates the abovementioned exposure control signal and outputs the generated exposure control signal to the distance image sensor 20.

(ii) The Signal Processing Unit 32

The signal processing unit 32 arranges the first light reception signal and the second light reception signal represented by the analog signals output from the distance image sensor 20 to undergo various types of signal processing processes such as a voltage level adjustment, noise removal, amplification, and the like and further performs a process of converting each of the signals into a digital signal, and the like.

For example, the signal processing unit 32 may be constructed by using an AFE, an A/D converter, and the like. However, as explained above, the physical construction thereof is not particularly limited.

(iii) The Light Beam Traveling Distance Information Generating Unit 33

The light beam traveling distance information generating unit 33 is constructed by using the abovementioned computing device and the like and includes, in the functional construction thereof, a distance calculating unit 33a and a distance image generating unit 33b. The functions of these units are realized as a result of reading a distance calculating program and a distance image generating program stored in advance in a program memory while using a part of a data memory as a work area and further causing a computing device (a computer) to perform computing processes.

The distance calculating unit 33a calculates the light beam traveling distance of the received light beam for each of the pixels, on the basis of the first light reception signal and the second light reception signal output from the distance image sensor 20 via the signal processing unit 32.

On the basis of the light beam traveling distance calculated by the distance calculating unit 33a for each of the pixels, the distance image generating unit 33b generates distance image data used for forming a distance image of the exiting light from the optical system 1 received on the light receiving plane.

(iv) The Controlling Unit 34

The controlling unit 34 is constructed by using the abovementioned computing device and the like and controls the light source unit 10 and the distance image sensor 20. The program memory stores therein, in advance, a program used for controlling the light source unit 10 and the distance image sensor 20, as well as programs defining procedures required by the identification of disturbance light and the generation of disturbance light separation information described below and various types of data. The controlling unit 34 controls operations of each unit and performs the operations described below related to the identification and the separation of disturbance light, by reading the programs stored in the program memory while using a part of a data memory as a work area and causing a computer to perform computing processes. In this situation, although the light beam traveling distance information generating unit 33 and the controlling unit 34 are functionally constructed as being separated from each other, these units may physically be constructed together as one. In other words, the light beam traveling distance information generating unit 33 and the controlling unit 34 may be realized by using a single FPGA or the like.

1-2. Operations 1-2-1. Overview

Figure 4:
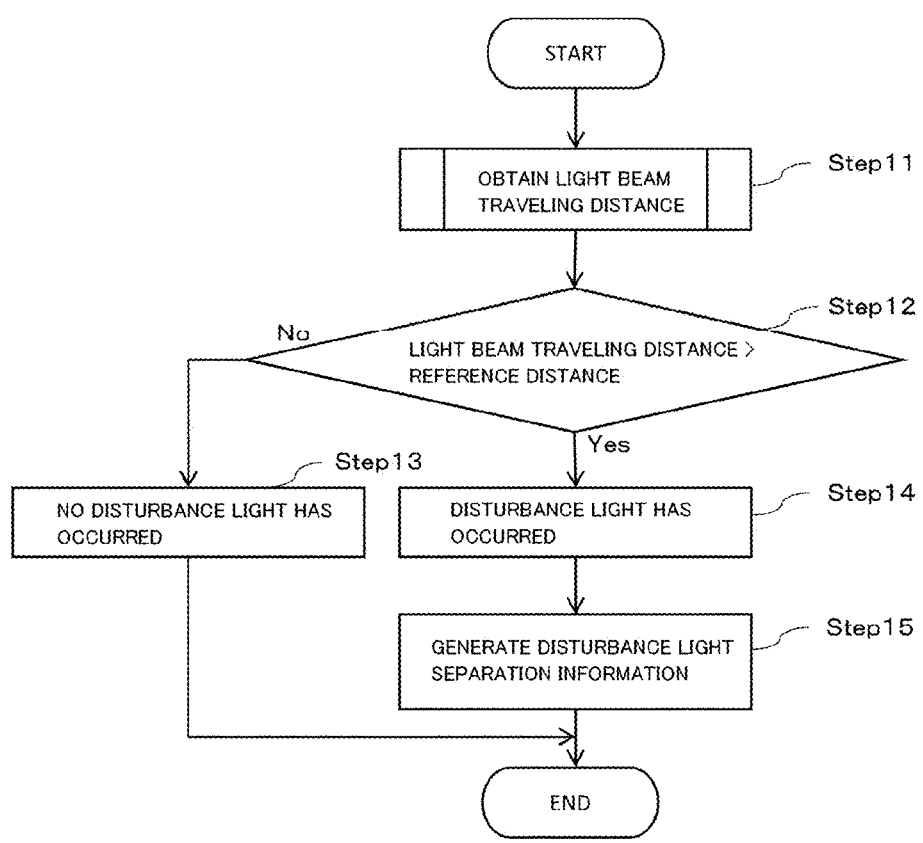
FIG. 4 is a flowchart showing a procedure for identifying the presence/absence of, and for separation of, a disturbance light component according to the first embodiment.

Next, an overview of operations performed by the disturbance light identifying and separating apparatus 100 will be explained, with reference to FIG. 4. To identify and separate disturbance light, the controlling unit 34 calculates a light beam traveling distance on the basis of the exiting light from the optical system 1 received by the distance image sensor 20 for each of the pixels (Step 11) and identifies whether or not the exiting light from the optical system 1 contains a disturbance light component on the basis of the light beam traveling distances (Steps 12 through 14). In this situation, as explained above, it is determined that a disturbance light component is contained when the received exiting light has a light beam traveling distance exceeding the reference distance, on the basis of the reference distance determined on the basis of the designed optical path length of the optical system 1 subject to the inspection and the light beam traveling distance of the exiting light from the optical system 1 received by the distance image sensor 20. The reference distance is set by taking into account the distance from the light source unit 10 to the incident plane of the optical system 1 as well as the distance from the exit plane of the optical system 1 to the light receiving plane of the distance image sensor 20, for example.

When the light beam traveling distance of the exiting light from the optical system 1 does not exceed the reference distance, i.e., when the light beam traveling distance has no abnormality (Step 12: No), it is determined that the exiting light from the optical system 1 contains no disturbance light component, i.e., that no disturbance light has occurred (Step 13), and the exiting light from the optical system 1 is output as normal light (Step 16). On the contrary, when the light beam traveling distance of the exiting light from the optical system 1 exceeds the reference distance, i.e., when the light beam traveling distance is abnormal (Step 12: Yes), it is determined that the exiting light from the optical system 1 contains a disturbance light component, i.e., that disturbance light has occurred (Step 14), disturbance light separation information used for separating the disturbance light component from the exiting light from the optical system 1 is generated on the basis of a known light source response waveform, subsequently the disturbance light component is separated from the exiting light from the optical system 1 (Step 15), and normal light is output (Step 16). In the following sections, details of the procedures will be explained.

1-2-2. The Light Beam Traveling Distance Obtaining Step (Step 11)

Figure 3:
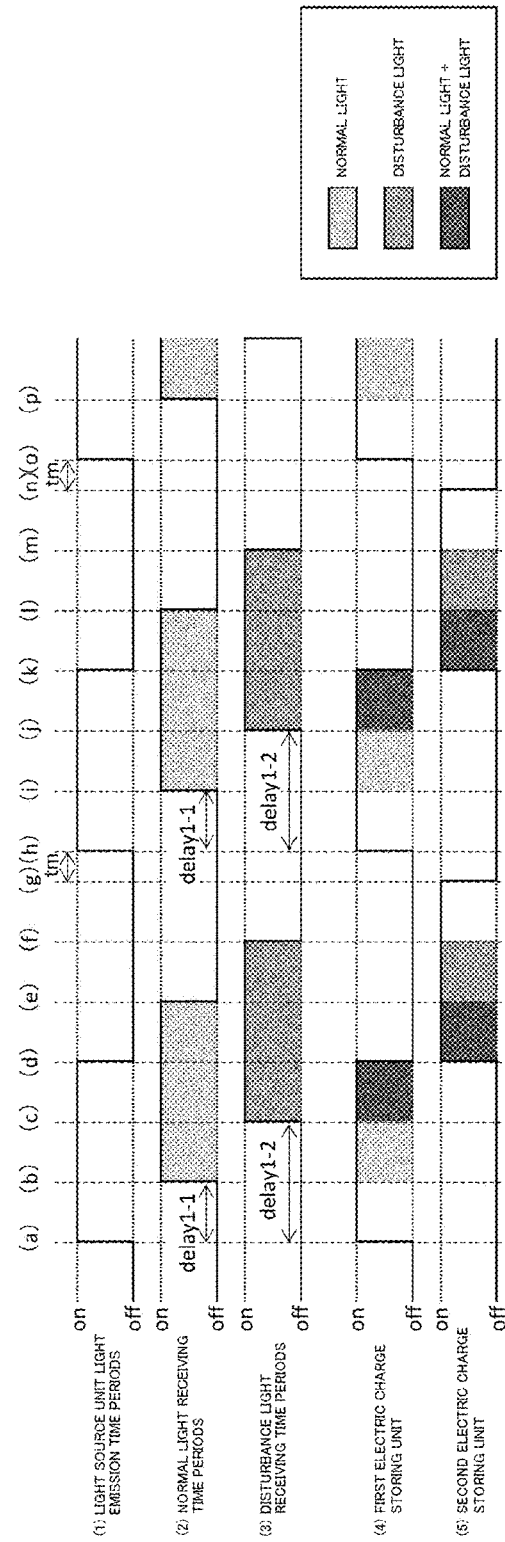
FIG. 3 is a timing chart showing an example of an operation performed by the disturbance light identifying and separating apparatus according to the first embodiment.

With reference to the timing chart shown in FIG. 3, the following explains the procedure for obtaining the light beam traveling distance within the optical system 1, on the basis of the exiting light from the optical system 1 received by the distance image sensor 20 for each of the pixels.

(1) The Light Emission of the Light Source Unit 10

To calculate the light beam traveling distances, the controlling unit 34 controls the timing generating unit 31 so as to transmit the light emission control signal to the light source unit 10. The light source unit 10 emits the pulse light with the predetermined pulse width according to the light emission control signal input thereto from the timing generating unit 31.

FIG. 3 (1) shows light emission periods of the light source unit 10. In the present embodiment, as shown in FIG. 3 (1), the light source unit 10 emits light during the time period from (a) to (d) and turns the light off during the time period from (d) to (g). By using these time periods as one cycle, the light source unit 10 emits pulse light one or more times during the predetermined exposure time period, while having a predetermined timing margin tm (the time period from (g) to (h)). In the present embodiment, the light source unit 10 repeatedly emits pulse light a predetermined number of times determined in advance (e.g., hundreds times to tens of thousands of times) during the predetermined exposure time period. Note that, however, the number of times the light source unit 10 emits light during the predetermined exposure time period is not particularly limited, as long as it is possible to ensure a sufficient amount of light for enabling the distance image sensor 20 to identify the presence/absence of a disturbance light component. If this condition is satisfied, the number of times the light source unit 10 emits light during the predetermined exposure time period may be one.

(2) Receiving the Exiting Light from the Optical System 1

When the light source unit 10 starts emitting the pulse light, the light irradiated from the light source unit 10 reaches the incident plane of the optical system 1. Further, the light incident on the optical system 1 travels through the optical path within the optical system 1, exits from the exit plane of the optical system 1, and reaches the distance image sensor 20.

(i) The Normal Light

The normal light contained in the exiting light from the optical system 1, i.e., the light beam having a traveling distance equal to or shorter than the abovementioned reference distance reaches the distance image sensor 20 after a predetermined delay time period (delay 1-1) has elapsed since the start of the light emission of the light source unit 10. In the example in FIG. 3 (2), it is assumed that, when the delay time period (delay 1-1) corresponding to the time length from (a) to (b) has elapsed, the normal light reaches the distance image sensor 20 during the time period from (b) to (e). The delay time period (delay 1-1) is a time period unique to the optical system 1. The delay time period (delay 1-1) is obtained as known information, for example, through an optical simulation or from a result of an examination using a reference optical system or the like and may be stored in advance in a data memory of the controlling unit 34 or the like. In this situation, the reference optical system is an optical system which has the same optical construction as that of the optical system 1 and of which the amount of occurring disturbance light (i.e., the light amount level of the disturbance light component for each of the pixels) is confirmed in advance to be equal to or lower than a tolerance level determined by the manufacturer, a user, a third-party institution, or the like. Further, the signal waveform of the normal light received by the distance image sensor 20 is also similarly obtained as known information and may be stored in advance in a data memory of the controlling unit 34 or the like.

(ii) The Disturbance Light

The disturbance light contained in the exiting light from the optical system 1 reaches the distance image sensor 20 while delaying from the normal light. In the example in FIG. 3 (3), it is assumed that the disturbance light reaches the distance image sensor 20, when a delay time period (delay 1-2) corresponding to the time length from (a) to (c) has elapsed since the start of the light emission of the light source unit 10. Until the disturbance light identifying and separating apparatus 100 finishes the disturbance light identifying process and the separation information generating process, information about whether or not disturbance light has occurred, the length of the delay time period (delay 1-2), and the signal waveform of the disturbance light is unknown information.

(iii) The Light Reception Signal (the Response Signal)

Next, a light receiving operation of the distance image sensor 20 will be explained. The distance image sensor 20 is optically exposed for the predetermined exposure time period and outputs the electric charge stored therein during the exposure time period to the control unit 30 as the light reception signal. The light reception signal corresponds to the response signal of the optical system 1 with respect to a signal input, which is input to the optical system 1 from the light source unit 10 and is the pulse light having the predetermined pulse width.

As explained above, in the present embodiment, the CCD sensor using the TOF method is employed as the distance image sensor 20. In the present embodiment, it is assumed that, in synchronization with the turning on and off of the light source unit 10, the electric charges are alternately distributed between the first electric charge storing unit and the second electric charge storing unit. In other words, in synchronization with the turning on and off of the light source unit 10, the first electric charge storing unit and the second electric charge storing unit are switched on and off.

Note that, as shown in FIGS. 3 (2) and (3), the exiting light from the optical system 1 does not reach the distance image sensor 20 during the time period from (a) to (b). During the time period from (b) to (c), only the normal light reaches the distance image sensor 20. During the time period from (c) to (e), the normal light and the disturbance light reach the distance image sensor 20 as being convolved on each other. During the time period from (e) to (f) only disturbance light reaches the distance image sensor 20. During the time period from (f) to (g), the exiting light from the optical system 1 does not reach the distance image sensor 20.

The first electric charge storing unit is turned on during the time period from (a) to (d). Accordingly, the first electric charge storing unit stores therein an electric charge corresponding to the light amounts of the normal light that has reached the distance image sensor 20 during the time period from (b) to (c) and the convolved light made up of the normal light and the disturbance light that has reached the distance image sensor 20 during the time period from (c) to (d) (see FIG. 3 (4)).

The second electric charge storing unit is turned on during the time period from (d) to (g). Accordingly, the second electric charge storing unit stores therein an electric charge corresponding to the light amounts of the convolved light made up of the normal light and the disturbance light that has reached the distance image sensor 20 during the time period from (d) to (e) and the disturbance light that has reached the distance image sensor 20 during the time period from (e) to (f) (see FIG. 3 (5)). During the timing margin tm (from (g) to (h)), the first electric charge storing unit and the second electric charge storing unit are turned off.

During the predetermined exposure time period, the distance image sensor 20 repeatedly performs the operation described above. Further, when the predetermined exposure time period has elapsed, signal voltage levels corresponding to electric charges stored in the first electric charge storing unit and the second electric charge storing unit are output to the control unit 30 as the first light reception signal and the second light reception signal, respectively. The light reception signal is constructed with the first light reception signal and the second light reception signal.

(3) The Calculation of the Light Beam Traveling Distance

When the light reception signal is input thereto from the distance image sensor 20, the control unit 30 causes the light reception signal to undergo the abovementioned signal processing processes in the signal processing unit 32. The distance calculating unit 33a included in the light beam traveling distance information generating unit 33 calculates the traveling distance of the received light beam for each of the pixels, on the basis of the ratio of signal intensities between the first light reception signal and the second light reception signal. The distance image generating unit 33b generates the distance image data on the basis of the light beam traveling distance calculated for each of the pixels.

As a result of the series of operations described above, the light beam traveling distance for each of the pixels is obtained from the light receiving operation (an imaging operation) corresponding to one session (one sequence) performed during the predetermined exposure time period, so that the distance image reflecting the light beam traveling distances within the optical system 1 is generated on the basis of the distance image data.

1-2-3. The Identifying Step (Steps 12 Through 14)

The controlling unit 34 compares the light beam traveling distance obtained for each of the pixels in the manner explained above with the abovementioned reference distance, so as to identify whether or not each of the light beam traveling distances exceeds the reference distance (Step 12). At Step 12, when it is identified that the light beam traveling distance is equal to or shorter than the reference distance (Step 12: No), it is determined that the exiting light from the optical system 1 contains no disturbance light component, i.e., that no disturbance light has occurred in the optical system 1 (Step 13), and the process is thus ended.

On the contrary, when it is identified at Step 12 that the light beam traveling distance exceeds the reference distance (Step 12: Yes), it is determined that disturbance light has occurred in the optical system 1 (Step 14).

Note that it is acceptable at Steps 13 and 14 to arrange a display device (not shown in the drawings) connected to the control unit 30 to display the result of the identification indicating that no disturbance light has occurred or that disturbance light has occurred. Further, together with the result of the identification, a display device or the like may be arranged to display the distance image schematically shown in FIGS. 5(a) and 5(b). The distance image will be explained later.

1-2-4. The Disturbance Light Separation Information Generating Step (Step 15)

When the light beam traveling distance of the exiting light from the optical system 1 exceeds the reference distance (Step 12: Yes) and it is determined that disturbance light has occurred in the optical system 1 (Step 14), the controlling unit 34 generates the disturbance light separation information used for separating the disturbance light component from the exiting light from the optical system 1, on the basis of the signal waveform of the exiting light from the optical system 1 and the normal light waveform that is known and stored in advance in the data memory or the like (Step 15), and the process is ended.

It is assumed that the series of processes described above is performed for each of the pixels.

1-3. Estimating or Identifying a Causal Plane

Next, a method for estimating or identifying on which plane the disturbance light is occurring, when it is determined at the identifying step (Steps 12 through 14) described above that the exiting light from the optical system 1 contains a disturbance light component, will be explained.

As explained above, at Step 11, the light beam traveling distance is obtained for each of the pixels. In contrast, the designed optical path length of the optical system 1, the distance between the optical surfaces constructing the optical system 1, the shape of the lens barrel, and the like are each optical design information that is known. Further, distance information related to the background or the like can also be obtained as known information. It is possible to analyze the traveling optical path of the disturbance light within the optical system 1, on the basis of these pieces of optical design information of the optical system subject to the inspection or the like and the light beam traveling distance of the disturbance light component obtained at Step 11.

When the traveling optical path of the disturbance light within the optical system 1 has become apparent, it is possible to estimate or identify the causal plane on which the disturbance light has occurred. For instance, in the example in FIG. 1B, the light reflected on the image side surface of the third lens L3 passes through the second lens L2 and is then reflected on the image side surface of the first lens L1. It is normal for a part of the light incident on a lens surface to be reflected on a lens surface. Accordingly, it is considered that in the example in FIG. 1B, the object side surface of the first lens L1 has a factor that causes abnormal reflection or scattering of the incident light, such as abnormal reflectance caused by a defective surface treatment (e.g., anti-reflection coating) or a small scratch or dirt. By analyzing the traveling optical paths of other disturbance light components, it is possible to identify the causal plane on which the disturbance light has occurred.

1-4. The Identifying on the Disturbance Light Made by Using the Distance Image

In the example above, it is identified at Steps 12 through 14 whether or not the exiting light from the optical system 1 contains a disturbance light component on the basis of the light beam traveling distance. However, in the disturbance light identifying and separating apparatus 100, the controlling unit 34 does not necessarily have to identify the presence/absence of a disturbance light component. For example, another arrangement is also acceptable in which, on the basis of the distance image data generated based on the light beam traveling distance of each of the pixels obtained at Step 11, a display device or the like is caused to display a distance image such as that shown in FIGS. 5(a) and 5(b) or an image output device or the like is caused to output the distance image on an output medium such as a sheet of paper, so that a viewer can identify the presence/absence of a disturbance light component on the basis of the distance image. The distance image corresponds to a distance image of the light source imaged by the optical system 1.

Figure 5B:
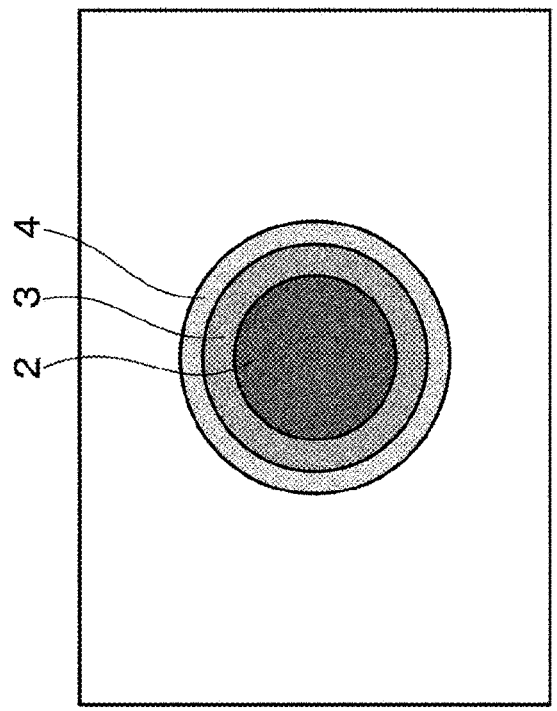
FIGS. 5(a) and 5(b) are schematic drawings showing an example of a distance image imaged by using the disturbance light identifying and separating apparatus according to the first embodiment.
Figure 5A:
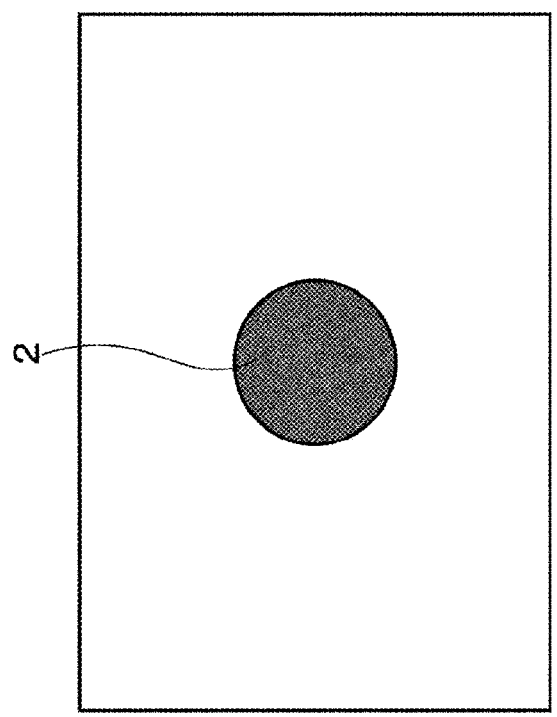

An example of the distance image is shown in FIGS. 5(a) and 5(b). FIG. 5(a) is a drawing schematically showing a distance image obtained when the abovementioned reference optical system is used as the optical system 1. FIG. 5(b) is a drawing schematically showing a distance image obtained when disturbance light is occurring in the optical system 1. Further, for the sake of convenience in the explanation, the display of the background is omitted from FIGS. 5(a) and 5(b).

FIG. 5(a) shows a light source image 2. In contrast, FIG. 5(b) shows a first disturbance light image 3 and a second disturbance light image 4 in the surroundings of the light source image 2. The mutually-different hatching patterns indicate mutually-different light beam traveling distances. In this manner, viewers are able to easily identify the presence/absence of a disturbance light component, on the basis of the distance image that is either displayed by the display device or the like or output on the output medium by the image output device or the like.

According to the method described above by which the distance image is generated on the basis of the exiting light from the optical system 1 that has exited the optical system 1, so as to identify whether or not disturbance light has occurred on the basis of the distance image, the following advantages are achieved in comparison to another method by which pulse light is irradiated from the light source unit 10 onto the optical system 1 in the same manner as described above, so as to obtain a normal captured image (a visible light image) and to identify whether or not disturbance light has occurred on the basis of the captured image.

According to the method by which it is identified whether or not disturbance light has occurred on the basis of the captured image, it may be difficult in some situations to view a disturbance light image in the captured image because the light amount of the disturbance light reaching the image plane I may be too small depending on how to apply light and how much applied light to the optical system 1. As a result, there may be some situations where only one of the two images (namely the first disturbance light image 3 and the second disturbance light image 4) shown in FIG. 5(b) is visible. There may be some situations where neither of the two images is visible.

Further, the first disturbance light image 3 and the second disturbance light image 4 are distance images formed by the beams of disturbance light having mutually-different light beam traveling distances within the optical system 1. In the normal captured image, it is expected to be difficult to view the first disturbance light image 3 and the second disturbance light image 4 shown in FIG. 5(b) while identifying the two images from each other. Further, in the normal captured image, it would not be possible to identify the light beam traveling distance of the disturbance light within the optical system 1. The reasons why it would be impossible to identify these two images from each other on the basis of the normal captured image can be explained from the following two aspects. First, a light source image, a background image, disturbance light images such as a flare and/or a ghost, as well as images caused by noise such as background noise and shot noise appear in the normal captured image. With respect to each of these images, the type of the image is determined primarily on the basis of the light amount thereof. The light amount of each of the images easily fluctuates depending on the imaging condition or the like. In other words, for these images, there is no light amount value that can be used as an index for identifying the images from one another. For this reason, it is impossible to set an objective judgment criterion such as a threshold value that can be used for identifying whether a certain image is a disturbance light image or not. Secondly, when the light amount differences in a captured image are larger than a measurable range or when the light amount differences among the images are too small, it may be impossible in some situations to identify the light amount differences among the images. For this reason, when a plurality of images are close to each other in the captured image, it would be impossible to identify the light amount differences among the images, and two or more images might be viewed as one image. In other words, by using the physical quantities such as the light amounts alone, it would be difficult to simply identify the number (the types) of images appeared in the captured image. For this reason, even when it is possible to recognize that disturbance light has occurred in the captured image by viewing a flare or a ghost therein, it may be impossible in some situations, as explained above, to view the first disturbance light image 3 and the second disturbance light image 4 while identifying these two images from each other. It is therefore expected to be impossible to estimate or identify the causal plane thereof.

In contrast, in the distance image, the information about the distance of the light beam received with respect to each of the pixels is appended for each of the pixels. The information about the distance is a physical quantity derived from the light beam traveling distance. The light beam traveling distance exhibits a unique value depending on the distance between the object corresponding to each of the image and the optical system 1 or the traveling distance of the light beam which may increase or decrease due to the cause of disturbance light or the like. In other words, when a disturbance light image appears in the vicinity of the light source image 2, it is difficult to view these two images while identifying the two from each other on the basis of the light amount difference. However, in the distance image, the light source image 2 is displayed as an image having a light beam traveling distance unique to the light source image 2, while the disturbance light image is displayed as an image having a light beam traveling distance different from that of the light source image 2. Accordingly, it is easy to identify these two images from each other. Similarly, it is difficult to view the disturbance light image 3 and the disturbance light image 4 while identifying the two images from each other on the basis of the light amount difference. However, in the distance image, the disturbance light image 3 is displayed as an image having a traveling distance unique to the cause thereof, while the disturbance light image 4 is also displayed as an image having a traveling distance unique to the cause thereof. For this reason, in the distance image, it is easy to identify the light source image 2 and the disturbance light images 3 and 4 from one another. Consequently, by using this method, it is possible to precisely identify the disturbance light regardless of the light amount of the disturbance light. Further, the beams of disturbance light having mutually-different light beam traveling distances within the optical system 1 are viewed as separate images. When two or more disturbance light images are viewed, it is possible to estimate or identify the causal planes on which the disturbance light is occurring, by analyzing the optical paths in the optical system 1 on the basis of the light beam traveling distances of the disturbance light images and the known optical design information or the like explained above.

1-5. Utilization of the Disturbance Light Separation Information

The disturbance light separation information generated at the separating step (Step 15) described above may be used as correction information to correct an optical image formed by the optical system 1, when the optical system 1 subject to an inspection by the disturbance light identifying and separating apparatus 100 is used as a manufactured product by a user or the like. For example, when the optical system 1 is an imaging lens of a imaging apparatus, it is possible to obtain an object image free from flares, ghosts, and the like, by storing preliminarily the disturbance light separation information as the correction information in the imaging apparatus in which the optical system 1 is to be mounted and constructing the imaging apparatus so as to be capable of eliminating disturbance light components from image forming light (an image signal) received on the image plane I by performing a signal processing process. Alternatively, it is also possible to generate an object image free from flares, ghosts, and the like, by storing the disturbance light separation information stored in correspondence with the optical system 1 in a personal computer (PC) or the like that has image processing software installed therein and further causing the PC or the like to read a captured image obtained by using the optical system 1 and to perform an image processing process thereon by using the disturbance light separation information described above.

The disturbance light identifying and separating apparatus 100 explained above is assumed to be used in an inspecting step during the manufacture of the optical system 1; however, it is also acceptable to construct the disturbance light identifying and separating apparatus 100 as an optical device such as an imaging apparatus or the like. In that situation, it is possible to identify whether or not disturbance light has occurred by arranging the optical system 1 mounted in the optical device to be in an inspection mode or the like in the optical device. Further, when an optical image or the like is obtained by using the optical device, it is also acceptable to separate a disturbance light component from the exiting light from the optical system 1, by using the disturbance light separation information generated at Step 15 in the optical device. Specific modes of these examples are not particularly limited.

2. Second Embodiment

Next, a disturbance light identifying apparatus and a disturbance light separating apparatus according to a second embodiment of the present invention will be explained. In the second embodiment, the disturbance light identifying apparatus and the disturbance light separating apparatus are integrally constructed as the disturbance light identifying and separating apparatus 100. Further, the disturbance light identifying and separating apparatus 100 according to the second embodiment is substantially the same as the disturbance light identifying and separating apparatus 100 according to the first embodiment, except that a part of the operations performed by the controlling unit 34 is different. Accordingly, some of the constituent elements that are the same will be referred to by using the same reference numerals, and the explanations thereof will be omitted. In the following sections, only operations of the disturbance light identifying and separating apparatus 100 according to the second embodiment will be explained.

2-1. Identifying and Separating Disturbance Light
2-1-1. Overview

First, an overview of a procedure for identifying and separating disturbance light according to a second embodiment will be explained with reference to FIG. 7. In the disturbance light identifying and separating apparatus 100 according to the second embodiment, to identify and separate disturbance light, the information about the light beam traveling distance is obtained from the exiting light from the optical system 1 received for each of the pixels (Step 21).

Subsequently, on the basis of the light beam traveling distance for each of the pixels obtained at Step 21, it is identified whether or not the light beam traveling distance exceeds the reference distance so as to determine whether or not disturbance light has occurred (Steps 22 through 24).

When the exiting light from the optical system 1 contains a disturbance light component, a deconvolution calculation is performed on the basis of the known light source response waveform (Step 25). The disturbance light separation information used for separating the disturbance light component from the exiting light from the optical system 1 is generated (Step 26).

In the second embodiment, the disturbance light identifying process and the disturbance light separating process are performed in substantially the same manner as in the first embodiment; however, among the steps described above, the light beam traveling distance obtaining step (Step 21), the deconvolution calculation step (Step 25), and the disturbance light separation information generating step (Step 26) are steps including processes different from those in the first embodiment and a step not being included in the first embodiment. Because the other steps are substantially the same as those in the first embodiment, the explanations thereof will be omitted. In the following sections, the light beam traveling distance obtaining step (Step 21), the deconvolution calculation step (Step 25), and the disturbance light separation information generating step (Step 26) will be explained.

2-1-2. The Light Beam Traveling Distance Obtaining Step (Step 21)

(1) A First Sequence

Figure 6:
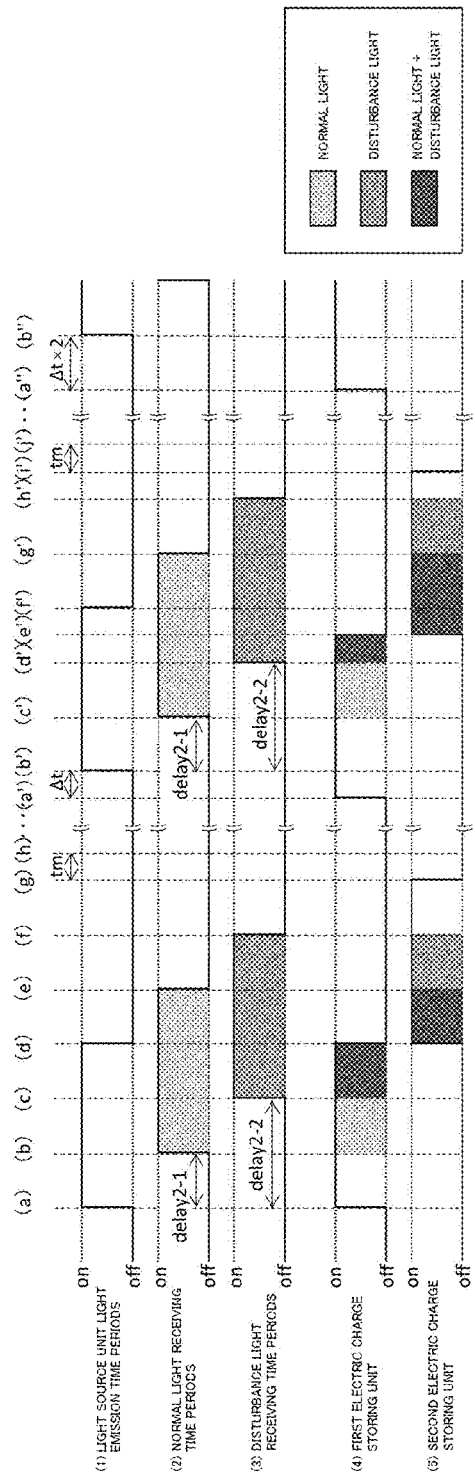
FIG. 6 is a timing chart showing an example of an operation performed by a disturbance light identifying and separating apparatus according to a second embodiment.

The following explanation refers to FIG. 6. To obtain the light beam traveling distance within the optical system 1, by using the same procedure as that in the first embodiment, the controlling unit 34 causes a series of operations to be performed in which, while the light source unit 10 (the modulated light irradiation unit) is irradiating the optical system 1 with pulse light during the predetermined exposure time period, the distance image sensor 20 receives the exiting light from the optical system 1 and further causes the distance image sensor 20 to output a light reception signal to the control unit 30. The light receiving operations in a first sequence (FIG. 6, (a) to (h), . . . ) are the same as those in the first embodiment.

More specifically, by controlling the light source unit 10 and the distance image sensor 20, during the time period from (a) to (g) the controlling unit 34 causes the light source unit 10 to emit pulse light and causes the distance image sensor 20 to receive the exiting light from the optical system 1 exiting from the optical system 1 in the same manner as in the first embodiment. The electric charges generated at the time of receiving the light are distributed to the first electric charge storing unit and the second electric charge storing unit by using predetermined timing. By using these operations as one cycle, the operations are repeatedly performed one or more times during the predetermined exposure time period while having the predetermined timing margin tm (the time period from (g) to (h)). These are the operations in the first sequence.

(2) A Second Sequence

Next, operations in a second sequence will be explained. As shown in FIG. 6, when the operations in the first sequence are completed, the timing with which the light source unit 10 is turned on and off is delayed by $\Delta t \times 1$ seconds from the timing used in the first sequence, without changing the timing for switching on and off the first electric charge storing unit and the second electric charge storing unit on the distance image sensor 20 side. In the example in FIG. 6, the second sequence is started at the point in time (a'). In the second sequence, the first electric charge storing unit is turned on at the point in time (a'), and subsequently, the light emitting unit is caused to start emitting pulse light at the point in time (b'), which is $\Delta t \times 1$ seconds later. The distance image sensor 20 is caused to perform the light receiving operation to receive the exiting light from the optical system 1, while the light emitting unit is caused to emit light in the same manner as in the first sequence, except that the timing of the light emitting unit to start emitting light is delayed by $\Delta t \times 1$ seconds. Further, these operations are repeatedly performed the same number of times as in the first sequence, during the predetermined exposure time period. In this situation, $\Delta t$ is a predetermined delay time period determined in advance. It is possible to set $\Delta t$ to an appropriate value as necessary, depending on the light emission pulse width and the exposure time period of the distance image sensor 20 or the like.

(3) A Third Sequence and Thereafter

When the operations in the second sequence are completed, the timing with which the light source unit 10 is turned on and off is delayed by $\Delta t \times 2$ seconds (the time period between (a") and (b")) from the timing used in the first sequence, without changing the timing for switching on and off the first electric charge storing unit and the second electric charge storing unit on the distance image sensor 20 side.

As explained above, the light reception signals corresponding to the N sequences are obtained while ensuring that, every time the light receiving operations corresponding to one sequence are finished, the timing with which the distance image sensor 20 starts receiving the exiting light from the optical system 1 is relatively shifted by $\Delta t \times (N-1)$ seconds from the timing with which the light source unit 10 emits the pulse light (the irradiation timing). As a result, it is possible to achieve convolution of the emission of the pulse light by the light source unit 10 and the exiting light from the optical system 1 that exits in response to the incidence of the pulse light, i.e., the response signal (an impulse response).

(4) Obtaining the Signal Waveform of the Response Signal

Further, in the second embodiment, by obtaining the light reception signals corresponding to the N sequences as described above, it is possible to clarify the changes in the signal intensity ratio between the first light reception signal and the second light reception signal exhibited every $\Delta t$ seconds. In other words, according to the second embodiment, on the basis of the light reception signals corresponding to the N sequences, it is possible to obtain the temporal changes in the light amount observed every $\Delta t$ seconds with respect to the exiting light from the optical system 1 received by the distance image sensor 20. Accordingly, it is possible to obtain the temporal changes in the signal intensity of the light reception signal output from the distance image sensor 20, i.e., of the response signal, which is to say, it is possible to obtain the signal waveform of the response signal.

2-1-3. The Deconvolution Calculation (Step 25)

The response signal obtained at Step 21 contains a normal light component and a disturbance light component. In the manner described above, it is possible to obtain the signal waveform of the response signal. Accordingly, by performing a deconvolution calculation, it is possible to clarify the signal waveform of a light source response signal, which is unknown, derived from the disturbance light received by the distance image sensor 20.

2-1-4. The Disturbance Light Separation Information Generating Step (Step 26)

The controlling unit 34 generates the signal waveform of the disturbance light calculated in the manner described above, as the disturbance light separation information used for separating the disturbance light from the exiting light from the optical system 1. The modes in which the disturbance light separation information can be used and the like are the same as those explained in the first embodiment.

By using the disturbance light identifying and separating apparatus 100 according to the second embodiment, it is possible to clarify the signal waveform of the exiting light from the optical system 1, by obtaining the light reception signals corresponding to the N sequences. Accordingly, it is also possible to generate the disturbance light separation information used for separating the disturbance light component from the exiting light from the optical system 1 on the basis of a larger amount of information than the amount of information used in the first embodiment. It is therefore possible to separate the disturbance light component from the exiting light from the optical system 1 with an excellent level of precision.

2-2. Identifying the Disturbance Light Component

In the second embodiment, it is possible to identify the presence/absence of a disturbance light component from the exiting light from the optical system 1, in the same manner as in the first embodiment. In that situation, it is acceptable to identify whether or not the exiting light from the optical system 1 contains a disturbance light component on the basis of the light reception signal output from the distance image sensor 20 as a result of the light receiving operations corresponding to one sequence. Alternatively, it is also acceptable to identify whether or not the exiting light from the optical system 1 contains a disturbance light component after clarifying the signal waveform of the response signal by having the light receiving operations corresponding to the N sequences performed.

Further, by performing the deconvolution calculation at Step 25, it is possible to obtain a distribution of signal intensities in correspondence with the light beam traveling distances. More specifically, with respect to the normal light component, a first disturbance light component, a second disturbance light component, . . . , and an n-th disturbance light component (where n is an integer of 1 or larger) that are contained in the exiting light from the optical system 1, it is possible to clarify the signal intensity for each of the components having mutually-different light beam traveling distances. In other words, it is possible to obtain the distribution of signal intensities in correspondence with the light beam traveling distances. It is therefore possible to perform various types of analyses on the basis of this information. For example, even when a plurality of ghosts appear in an image plane while overlapping with one another, because the signal intensity of each of the ghosts is clarified, it is possible to calculate the light amount for each of the ghosts. It is therefore possible to separate the ghosts from one another. Further, a distribution of signal intensities of a disturbance light component that appears as a ghost on the image plane I as a result of repeated reflections within the optical system 1 is exhibited as a sharp peak with respect to light beam traveling distances. In contrast, a distribution of signal intensities of a disturbance light component that appears as a flare on the image plane I as a result of powerful light from a light source or the like enters is exhibited as a distribution having a large width with respect to light beam traveling distances. In other words, by analyzing the distribution of signal intensities with respect to light beam traveling distances, it is possible to estimate the cause such as whether the light received for a certain pixel on the image plane was caused by a light beam that has traveled through the designed optical path, was caused by a light beam reflected due to a defect in the surface treatment on the lens surface, or was caused by a light beam inadvertently scattered within the optical system 1. In addition, it is possible to calculate the light amount of each light and to separate the disturbance light components.

Further, the light beam traveling distance of a disturbance light component appearing on the image plane I as a flare has a small difference from the light beam traveling distance of normal light (the light source). For this reason, for example, it may be difficult in some situations to clearly identify normal light and disturbance light from each other, by using only the light beam traveling distance obtained at the light beam traveling distance obtaining step (Step 21) shown in FIG. 6. Accordingly, there is a possibility that it may be determined that no disturbance light has occurred at Step 22 above, even though a disturbance light component is actually present. To cope with this situation, for the purpose of identifying the presence/absence of a disturbance light component separately from the flowchart shown in FIG. 7, it is also acceptable to identify the presence/absence of a disturbance light component by obtaining the light reception signals corresponding to the N sequences to clarify the signal waveform of the response signal and subsequently obtaining a distribution of signal intensities in correspondence with light beam traveling distances by performing the abovementioned deconvolution calculation. Further, by performing the abovementioned deconvolution calculation regardless of the identification result at Step 22 shown in FIG. 7, it is possible to generate the disturbance light separation information used for separating the disturbance light component from the exiting light from the optical system 1, even when it is not possible to clearly identify whether or not a disturbance light component is contained in the exiting light from the optical system 1.

3. Third Embodiment

Next, a disturbance light identifying apparatus and a disturbance light separating apparatus according to a third embodiment of the present invention will be explained, with reference to FIGS. 8 and 9.

3-1. Construction

First, a construction of a disturbance light identifying and separating apparatus 200 according to the third embodiment will be explained with reference to FIG. 8. Similarly to the first and the second embodiments, the disturbance light identifying and separating apparatus 200 is obtained by integrally constructing a disturbance light identifying apparatus and a disturbance light separating apparatus.

The disturbance light identifying and separating apparatus 200 according to the third embodiment is substantially the same as the disturbance light identifying and separating apparatus 100 according to the first and the second embodiments. However, the disturbance light identifying and separating apparatus 200 according to the third embodiment is different from the disturbance light identifying and separating apparatus 100 according to the first and the second embodiments for the construction of the modulated light irradiation unit set forth in the present invention. In the first and the second embodiments, the modulated light irradiation unit set forth in the present invention is constructed as the light source unit 10. Further, the pulse light (the modulated light) is irradiated from the light source unit 10 onto the optical system 1.

In contrast, in the disturbance light identifying and separating apparatus 200 according to the third embodiment, a first shutter S1 is provided, in place of the light source unit 10, on the incident side of the optical system 1, so that pulse light incident on the optical system 1 as a result of opening and closing the first shutter S1 at a high speed. The first shutter S1 is a high-speed shutter that can be switched into an open state and a closed state, at time intervals of tens of nano-seconds, or preferably, at time intervals of nano-seconds, for example. The controlling unit 34 causes the timing generating unit 31 to input an open/close signal to the first shutter S1. According to the open/close signal input thereto from the timing generating unit 31, the first shutter S1 is switched between the open state and the closed state. The other constructions are the same as those in the first and the second embodiments. Accordingly, some of the constituent elements that are the same will be referred to by using the same reference numerals, and the explanations thereof will be omitted.

3-2. Operations

Next, operations of the disturbance light identifying and separating apparatus 200 according to the third embodiment will be explained, with reference to FIG. 9. In the third embodiment, the pulse light incident on the optical system 1 as a result of opening and closing the first shutter S1 at a high speed, in place of the light source unit 10 included in the disturbance light identifying and separating apparatus 100 according to the first and the second embodiments. For example, as shown in FIG. 9 (1), by opening and closing the first shutter S1 while using the same timing as the timing with which the light source unit 10 is switched on and off in FIG. 3 (1), it is possible to identify and separate the disturbance light component by performing the same procedures as those shown in FIGS. 3 and 4 explained in the first embodiment.

Figure 7:
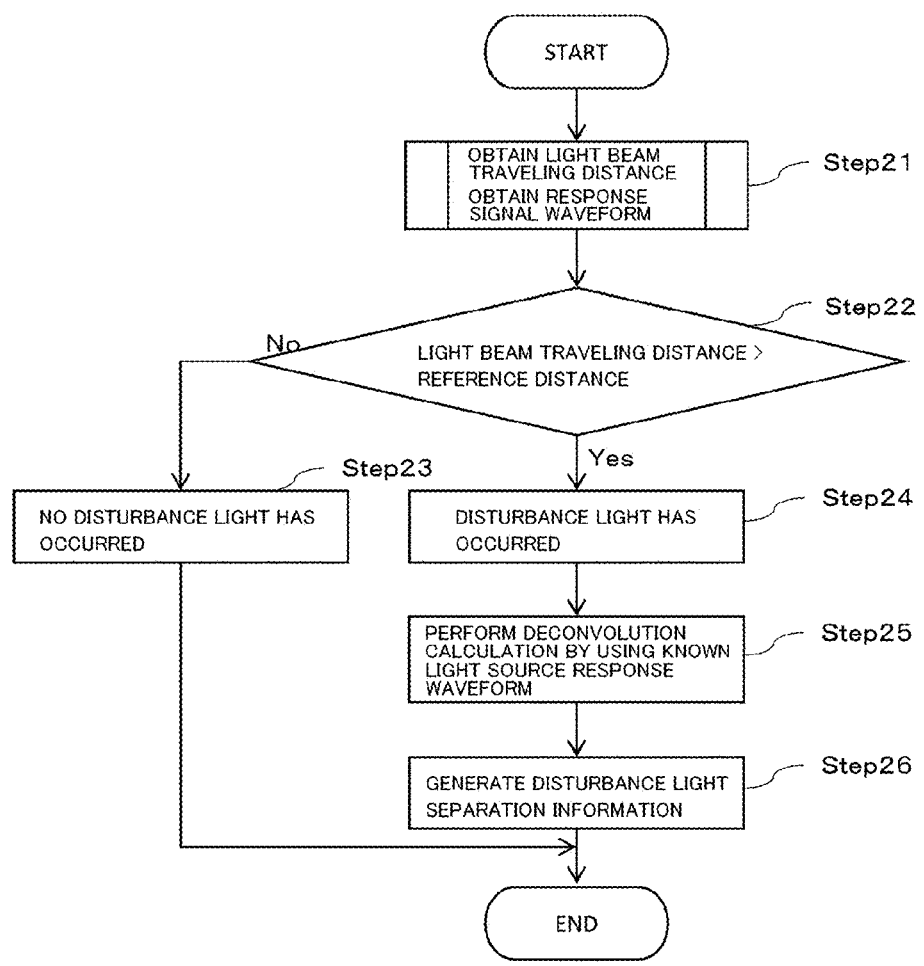
FIG. 7 is a flowchart showing a procedure of detecting and separating disturbance light according to the second embodiment.

Further, although not shown in the drawings, by opening and closing the first shutter S1 while using the same timing as the timing with which the light source unit 10 is switched on and off in FIG. 6 (1) and also causing the distance image sensor 20 to perform the light receiving operations as shown in FIG. 6, (4) and (5), it is possible to identify and separate the disturbance light component by performing the same procedures as those shown in FIGS. 6 and 7 explained in the second embodiment. In other words, it is also possible to obtain the signal waveform of the response signal by performing the abovementioned convolution process and to generate the disturbance light separation information by performing the deconvolution calculation.

In the third embodiment, because the modulated light irradiation unit set forth in the present invention is constructed by using the first shutter S1 in place of the light source unit 10 explained in the first and the second embodiments, the following advantages are achieved.

The disturbance light identifying and separating apparatus 100 according to the first and the second embodiments is used for inspecting whether or not the optical system 1 maintains a level of quality required as manufactured products, at the inspection stage or the like before the optical system 1 is shipped as a manufactured product. Alternatively, the disturbance light identifying and separating apparatus 100 according to the first and the second embodiments are expected to be in the situation where, for example, the disturbance light identifying and separating apparatus 100 detects in advance the disturbance light components, which occurs as an individual difference of the optical system 1 even though the optical system 1 maintains the level of quality required as manufactured products, and generates in advance the disturbance light separation information, so that it is possible to store the disturbance light separation information to be held, as the correction information used for correcting optical images, in the optical device into which the optical system 1 is to be incorporated.

In contrast, by using the disturbance light identifying and separating apparatus 200 according to the third embodiment, for example, it is possible to carry out the embodiment as an imaging apparatus equipped with the optical system 1 serving as an imaging lens, while the optical system 1 is provided with the first shutter S1. In other words, it is possible to realize the embodiment as an imaging apparatus (200) equipped with a disturbance light identifying and separating function. For example, when an object is to be imaged, it is identified whether or not disturbance light occurs by using the imaging apparatus (200) and, when disturbance light occurs, disturbance light separation information used for separating the disturbance light from the exiting light from the optical system 1 is generated. By imaging the object after that, it is possible to easily separate the disturbance light component from the imaged light on the basis of the disturbance light separation information.

Accordingly, for example, when a user images the sky at night by using the imaging apparatus (200), it is possible to prevent a ghost caused by a light source such as a street lamp appears in the captured image. It is therefore possible to obtain a captured image compliant with the imaging intention of the user who took the image. Further, when an imaging process is performed with backlight, it is difficult to completely inhibit the occurrence of flares or the like with the construction of the imaging lens or the like. However, by using the imaging apparatus (200), it is possible to inhibit the occurrence of flares and the like even when an imaging process is performed with backlight. Similarly, by applying the imaging apparatus (200) to an imaging apparatus used for traffic monitoring and to an in-vehicular imaging apparatus, it is possible to easily obtain sharp and clear object images by inhibiting the occurrence of ghosts and flares regardless of the environments in which the devices are being used.

In other words, according to the third embodiment, by mounting the first shutter S1 and the controlling mechanism related to the disturbance light identification and separation to be mounted in the optical device that has mounted thereon the optical system satisfying the level required as manufactured products, it is possible to inhibit the occurrence of flares and ghosts exhibited under specific conditions, which are difficult to avoid at the stage of using the devices.

Figure 8:
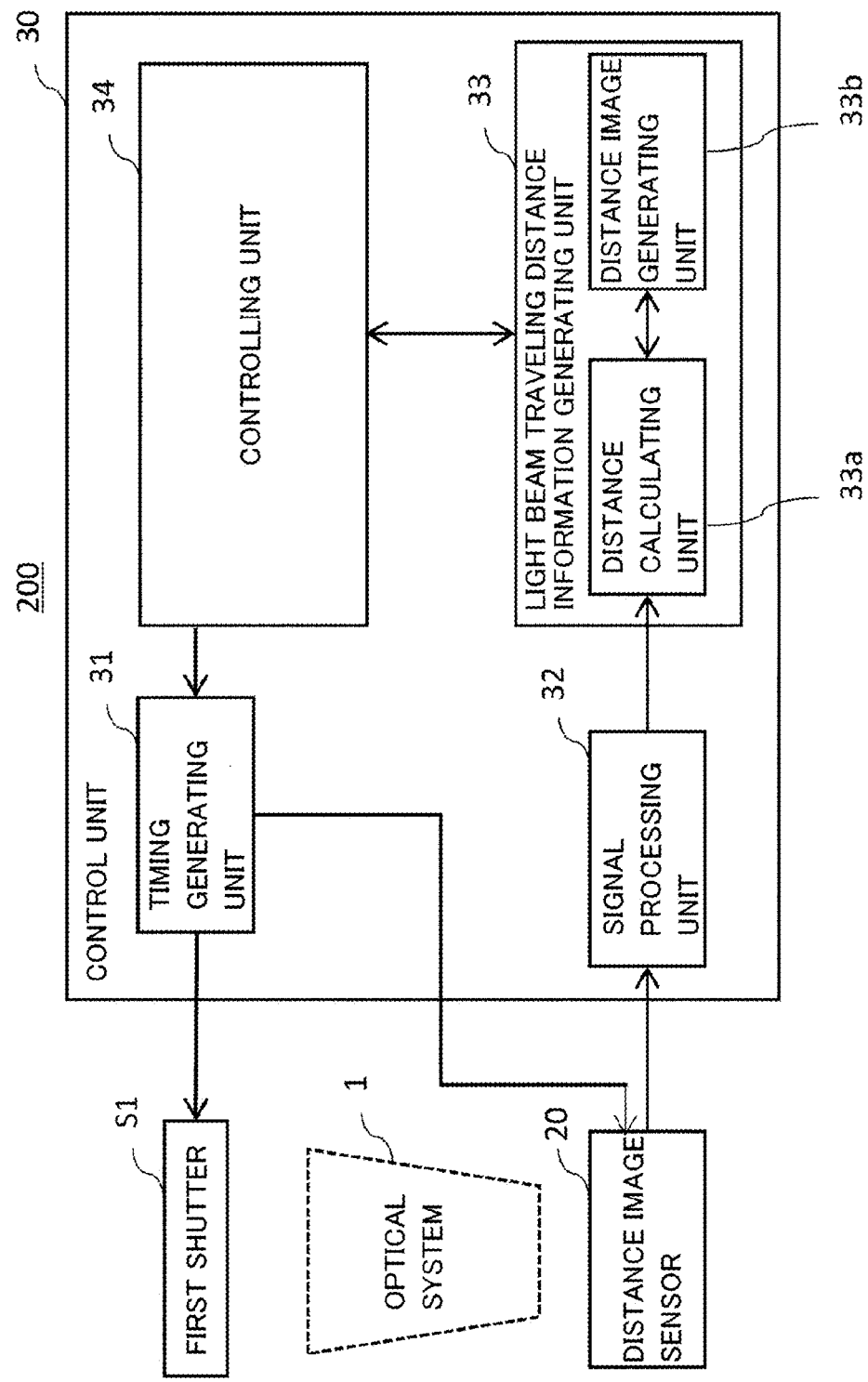
FIG. 8 is a block diagram showing an exemplary construction of a disturbance light identifying and separating apparatus according to a third embodiment.
Figure 9:
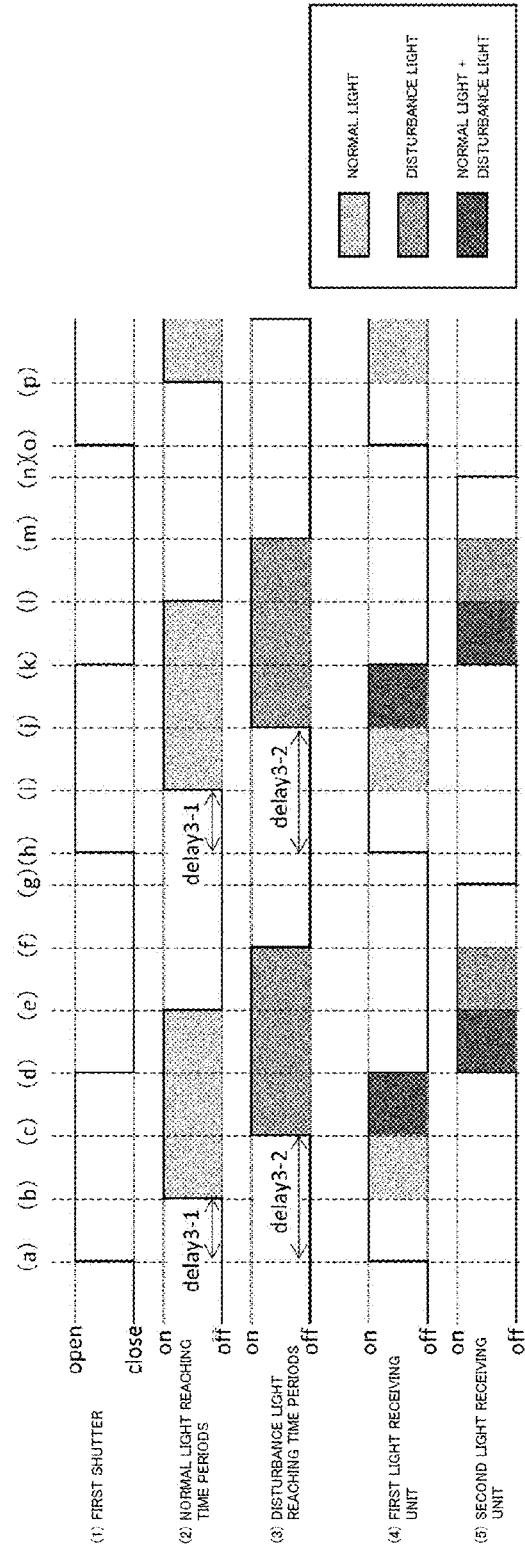
FIG. 9 is a timing chart showing an example of an operation performed by the disturbance light identifying and separating apparatus according to the third embodiment.

In FIG. 8, the first shutter S1 is arranged on the outside (the incident side) of the optical system 1; however, the arrangement of the first shutter S1 is not limited to the example shown in FIG. 8. The first shutter S1 may be arranged on the inside of the optical system 1. By arranging the first shutter S1 on the inside of the optical system 1, it is possible to arrange the diameter of the first shutter S1 to be approximately the same as the size of the optical elements constructing the optical system 1. It is therefore possible to miniaturize the first shutter S1.

4. Fourth Embodiment

Figure 10:
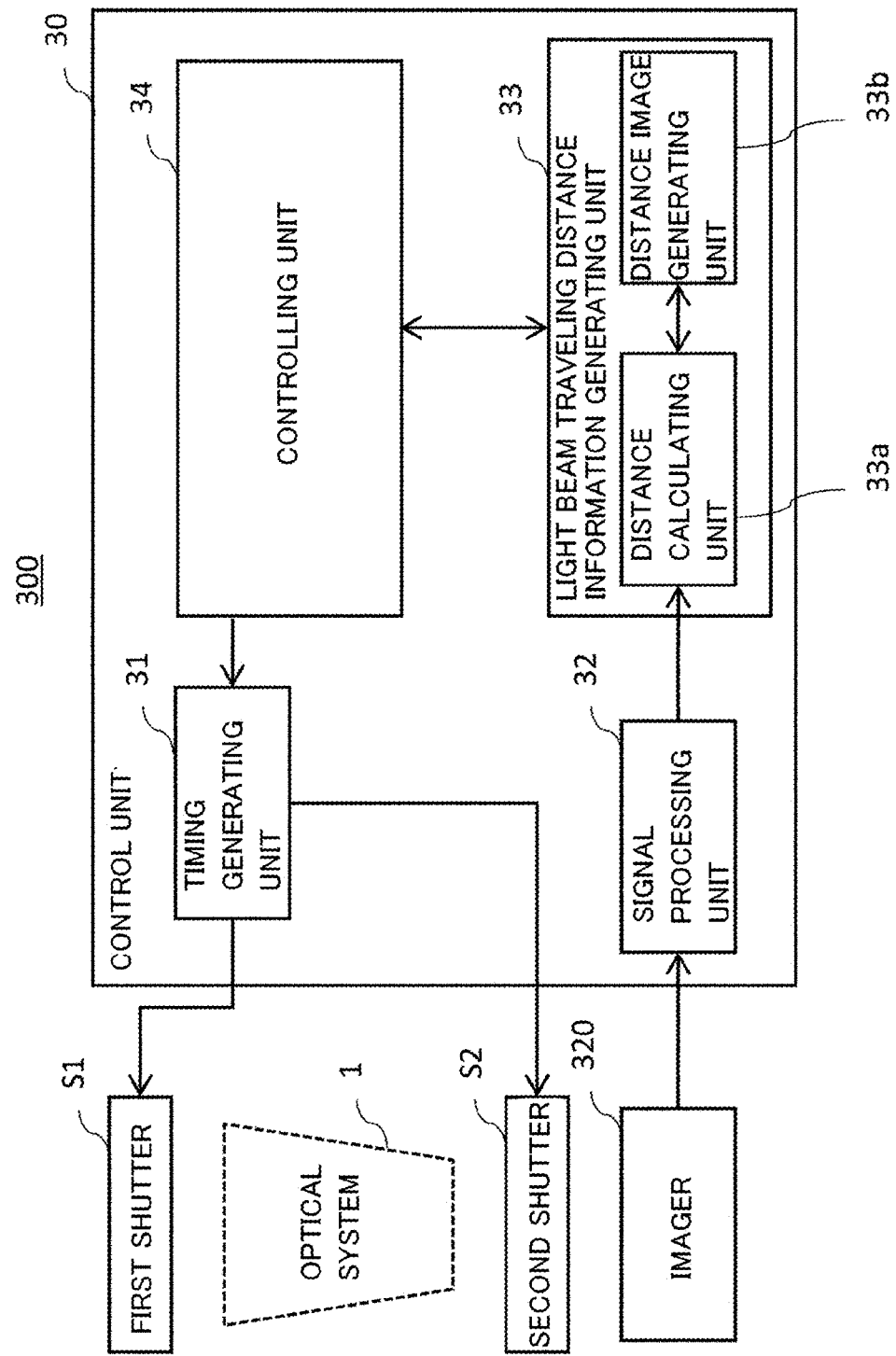
FIG. 10 is a block diagram showing an exemplary construction of a disturbance light separating apparatus according to a fourth embodiment.

Next, a disturbance light separating apparatus according to a fourth embodiment of the present invention will be explained, with reference to FIGS. 10 and 11. A disturbance light separating apparatus 300 is an apparatus used for separating normal light traveling through a designed optical path from disturbance light traveling through an optical path different from the designed optical path in the optical system 1.

4-1. Construction

First, a construction of the disturbance light separating apparatus 300 according to the fourth embodiment will be explained, with reference to FIG. 10. The disturbance light separating apparatus 300 according to the fourth embodiment has substantially the same construction as that of the disturbance light identifying and separating apparatus 100 according to the first and the second embodiments. However, the disturbance light separating apparatus 300 according to the fourth embodiment is different from the disturbance light identifying and separating apparatus according to the first and the second embodiments for not being equipped with a disturbance light identifying apparatus set forth in the present invention. Further, the disturbance light separating apparatus 300 according to the fourth embodiment is different from the disturbance light identifying and separating apparatus 100 according to the first and the second embodiments for the construction of the modulated light irradiation unit set forth in the present invention. Similarly to the third embodiment, the fourth embodiment is equipped with the first shutter S1 in place of the light source unit 10, so that the pulse light is irradiated onto the optical system 1 as a result of opening and closing the first shutter S1 at a high speed.

The first shutter S1 is a high-speed shutter, similarly to that in the third embodiment. It is desirable when the first shutter S1 can be switched between an open state and a closed state at time intervals of tens of nano-seconds, or preferably, at time intervals of nano-seconds, for example. The controlling unit 34 causes the timing generating unit 31 to input the open/close signal to the first shutter S1. According to the open/close signal input thereto from the timing generating unit 31, the first shutter S1 is switched between the open state and the closed state.

In the disturbance light separating apparatus 300 according to the fourth embodiment, an imager 320 (a solid image sensor/light receiving unit) is used in place of the distance image sensor 20. The disturbance light separating apparatus 300 is equipped with a second shutter S2 provided between the optical system 1 and the imager 320.

As long as the imager 320 has light receiving sensitivity for light having a wavelength within the wavelength region used by the optical system 1, specific modes thereof are not particularly limited. For example, when the optical system 1 uses a visible light region as the wavelength region in use, it is sufficient if the imager 320 has light receiving sensitivity for light beams in the visible light wavelength region. As another example, when the optical system 1 uses an infrared wavelength region as the wavelength region in use, it is sufficient if the imager 320 has light receiving sensitivity for light beams in the infrared wavelength region.

The disturbance light separating apparatus 300 according to the fourth embodiment is arranged so as to control the opening and closing of the second shutter S2 so that the second shutter S2 is open only during such time periods when normal light exiting the optical system 1 reaches the second shutter S2 and so that only the normal light is received. It is desirable to arrange the shutter speed of the second shutter S2 to be substantially equivalent to the shutter speed of the first shutter S1. Further, for example, it is desirable when the second shutter S2 can be switched between an open state and a closed state at time intervals in the range of nano-seconds to tens of nano-seconds.

4-2. Operations

Next, operations of the disturbance light separating apparatus 300 according to the fourth embodiment will be explained, with reference to FIG. 11.

(1) The First Shutter S1

FIG. 11 (1) shows opening and closing time periods of the first shutter S1. In the present embodiment, the first shutter S1 is open during the time period from (a) to (b), whereas the first shutter S1 is closed during the time period from (b) to (c). By using these time periods as one cycle, the first shutter S1 is opened and closed one or more times during a predetermined exposure time period, while having the predetermined timing margin tm (the time period from (c) to (d)). In the present embodiment, the first shutter S1 repeatedly performs the opening and closing operation a predetermined number of times determined in advance (e.g., hundreds times to tens of thousands of times) during the predetermined exposure time period. Note that, however, the number of times the first shutter S1 opens and closes during the predetermined exposure time period is not particularly limited, as long as it is possible to ensure a sufficient amount of light for the imager 320 to form an object image based on normal light. If this condition is satisfied, the number of times the first shutter S1 opens and closes during the predetermined exposure time period may be one. As a result of these operations of the first shutter S1, pulse light enters the optical system 1.

(2) The Second Shutter S2

FIG. 11 (2) shows opening and closing time periods of the second shutter S2. The second shutter S2 is opened only during such time periods when the normal light reaches the second shutter S2 as explained below and is closed during other time periods.

(3) The Normal Light

FIG. 11 (3) shows the time periods during which the normal light reaches the second shutter S2. During the time period from (a) to (b) when the first shutter S1 is in an open state, the light that incident on the optical system 1 travels through the inside of the optical system 1. Accordingly, the normal light contained in the exiting light from the optical system 1 reaches the second shutter S2 when a predetermined delay time period (delay 4-1) has elapsed since the point in time (a) at which the first shutter S1 is opened. In the example in FIG. 11 (3), it is assumed that, when the delay time period (delay 4-1) corresponding to the time length from (a) to (c) has elapsed, the normal light reaches the imager 320 during the time period from (c) to (e). The delay time period (delay 4-1) is a time period unique to the optical system 1. Similarly to the example in the first embodiment and the like, the delay time period (delay 4-1) is obtained as known information, for example, through an optical simulation or from a result of an examination using a reference optical system or the like and may be stored in advance in a data memory of the controlling unit 34 or the like.

The controlling unit 34 exercises control to open and close the second shutter S2 on the basis of the abovementioned delay timer period (delay 4-1) stored in advance.

(4) The Disturbance Light

FIG. 11 (4) shows time periods during which disturbance light reaches the second shutter S2. The disturbance light contained in the exiting light from the optical system 1 that has exited the optical system 1 reaches the second shutter S2 while delaying from the normal light. In the example in FIG. 11 (4), it is assumed that the disturbance light reaches the second shutter S2, when a delay time period (delay 4-2) corresponding to the time length from (a) to (c) has elapsed since the point in time at which the first shutter S1 is opened.

(5) The Imager 320

FIG. 11 (5) shows time period during which the light reaches the imager 320. The imager 320 stores received light therein for the predetermined exposure time period and outputs the stored light as a light reception signal to the control unit 30. However, the fourth embodiment is equipped with the second shutter S2 provided on the incident side of the imager 320. Accordingly, the time periods during which the light reaches the imager 320 is controlled by the opening and closing operations of the second shutter S2.

As explained above, the second shutter S2 is opened only during such time periods when the normal light reaches the second shutter S2. The light that has passed through the second shutter S2 reaches the imager 320 by taking time corresponding to the time period from (c) to (d). For this reason, in the example in FIG. 11 (5), the imager 320 receives light for a time period (from (d) to (f)) equal to the time period during which the second shutter S2 was open, when the delay time period of (c) to (d) has elapsed since the point in time (c) at which the second shutter S2 was opened. In the example in FIG. 11 (5), the disturbance light reaches the second shutter S2 at the point in time (e). At that time, the second shutter S2 is closed. Accordingly, in the example shown in FIG. 11, the disturbance light is blocked by the second shutter S2, so that only the normal light reaches the imager 320.

Consequently, according to the fourth embodiment, it is possible to eliminate the disturbance light component from the exiting light from the optical system 1, without performing the disturbance light identifying operation. Incidentally, in the example in FIG. 11, the time periods during which the normal light reaches the second shutter S2 do not overlap with the time periods during which the disturbance light reaches the second shutter S2. However, in actuality, there may be some situations in which a time period during which normal light reaches the second shutter S2 overlaps with a time period during which disturbance light reaches the second shutter S2. In that situation, by arranging the second shutter S2 to open only during such time periods when normal light alone reaches the second shutter S2, it is possible to allow the imager 320 to receive only the normal light.

When the time period ((c) to (e)) during which the second shutter S2 is opened is expressed as ts, whereas the delay time period (delay 4-2) (from (a) to (e)) until the disturbance light reaches the second shutter S2 is expressed as td, it is desirable when ts<1.5 td is satisfied. Also, it is desirable when ts<td is satisfied. In addition, as explained above, it is desirable when ts is equal to the time period during which only the normal light is received.

Similarly to the disturbance light identifying and separating apparatus 200 according to the third embodiment, it is possible to realize the disturbance light separating apparatus 300 according to the fourth embodiment, as an imaging apparatus equipped with the optical system 1 serving as an imaging lens, while the first shutter S1 is provided on the incident side of the optical system 1, whereas the second shutter S2 is provided on the exit side of the optical system 1. In other words, it is possible to carry out the embodiment as an imaging apparatus (300) equipped with a disturbance light separating function. It is therefore possible to achieve the same advantageous effects as those in the third embodiment.

Further, by using the same construction as that of the disturbance light separating apparatus 300 according to the fourth embodiment, it is also possible to perform the disturbance light identifying and separating processes explained in the first and the second embodiments. In other words, in the disturbance light identifying and separating apparatus 100 according to the first and the second embodiments, by replacing the light source unit 10 with the first shutter S1 and replacing the distance image sensor 20 with the second shutter S2 and the imager 320, it is also possible to perform the disturbance light identifying and separating operations, by using substantially the same procedures as those explained in the first and the second embodiments. Further, by using the disturbance light identifying and separating apparatus 100 or 200 according to any of the first to the third embodiments, it is possible to realize the disturbance light identifying and separating apparatus 100 or 200 according to any of the first to the third embodiments as a disturbance light separating apparatus similar to that in the fourth embodiment, by arranging the distance image sensor 20 to receive light only during such time periods when the normal light alone reaches the distance image sensor 20.

INDUSTRIAL APPLICABILITY

According to the present invention, it is possible to provide the disturbance light identifying apparatus and the disturbance light identifying method capable of precisely identifying whether or not the light exiting the optical system subject to the inspection contains a disturbance light component and capable of estimating the causal plane of the disturbance light, by using the simple technique. Also, it is possible to provide the disturbance light separating apparatus or the disturbance light separating method capable of separating the disturbance light component from the light exiting the optical system subject to the inspection by using the simple technique.

REFERENCE SIGNS LIST 1 optical system (optical system subject to an inspection)
2 light source image
3 first disturbance light image
4 second disturbance light image
10 light source unit
20 distance image sensor
30 control unit
31 timing generating unit
32 signal processing unit
33 light beam traveling distance information generating unit
33a distance calculating unit
33b distance image generating unit
34 controlling unit
100 disturbance light identifying and separating apparatus
200 disturbance light identifying and separating apparatus
300 disturbance light separating apparatus
320 imager
L1 first lens
L2 second lens
L3 third lens
I image plane
tm timing margin
S1 first shutter
S2 second shutter

What is claimed is:
1. A disturbance light identifying apparatus comprising:
a modulated light irradiation unit which is a light source that irradiates an optical system with modulated light, wherein the modulated light is a light of which a light amount changes in relation to time;
a light receiving unit that receives light exiting the optical system in response to an incidence of the modulated light from the modulated light irradiation unit; and
a controlling unit that controls the modulated light irradiation unit and the light receiving unit, wherein
while a light beam incident on the light receiving unit after traveling through an optical path exceeding a reference distance determined on a basis of a designed optical path length of the optical system is defined as a disturbance light component, the controlling unit identifies whether or not the light exiting the optical system contains the disturbance light component, on a basis of a light beam traveling distance obtained from the light exiting the optical system.

2. The disturbance light identifying apparatus according to claim 1, wherein
the modulated light irradiation unit includes a first shutter provided on an incident side of the optical system, and
the modulated light irradiation unit irradiates the optical system with pulse light by opening and closing the first shutter with predetermined timing.

3. The disturbance light identifying apparatus according to claim 1, wherein
the light receiving unit includes a distance image sensor.

4. The disturbance light identifying apparatus according to claim 1, wherein
a shutter is provided between the light receiving unit and the optical system, and
the controlling unit controls a light receiving operation of the light receiving unit by controlling opening and closing of the shutter.

5. A disturbance light separating apparatus comprising:
a modulated light irradiation unit which is a light source that irradiates an optical system with modulated light, wherein the modulated light is a light of which a light amount changes in relation to time;
a light receiving unit that receives light exiting the optical system in response to an incidence of the modulated light from the modulated light irradiation unit; and
a controlling unit that controls the modulated light irradiation unit and the light receiving unit, wherein
while a light beam incident on the light receiving unit after traveling through an optical path exceeding a reference distance determined on a basis of a designed optical path length of the optical system is defined as a disturbance light component, the controlling unit generates disturbance light component separation information used for separating the disturbance light component from the light exiting the optical system, on a basis of a light beam traveling distance obtained from the light exiting the optical system.

6. The disturbance light separating apparatus according to claim 5, wherein
Δt is a predetermined delay time period determined in advance,
the controlling unit obtains light reception signal information about a signal waveform of the light exiting the optical system by having N sequences of light receiving operations performed while ensuring that, every time one sequence of the light receiving operations is performed in which the light receiving unit is caused to receive the light exiting the optical system while the modulated light irradiation unit irradiates the optical system with the modulated light, timing to start receiving the light exiting the optical system is relatively shifted by Δt×(N−1) seconds (where N is an integer of 1 or larger) from irradiation timing of the modulated light, and
the controlling unit generates the disturbance light separation information on a basis of the light reception signal information.

7. The disturbance light separating apparatus according to claim 5, wherein
the controlling unit separates the disturbance light component from the light exiting the optical system on a basis of the disturbance light separation information.

8. The disturbance light separating apparatus according to claim 5, wherein
the modulated light irradiation unit is a light source that irradiates the optical system with the modulated light.

9. The disturbance light separating apparatus according to claim 5, wherein
the modulated light irradiation unit includes a first shutter provided on an incident side of the optical system, and
the modulated light irradiation unit irradiates the optical system with pulse light by opening and closing first shutter with predetermined timing.

10. The disturbance light separating apparatus according to claim 5, wherein
the light receiving unit includes a distance image sensor.

11. The disturbance light separating apparatus according to claim 5, wherein
a shutter is provided between the light receiving unit and the optical system, and
the controlling unit controls a light receiving operation of the light receiving unit by controlling opening and closing of the shutter.

12. A disturbance light separating apparatus comprising:
a modulated light irradiation unit which is a light source that irradiates an optical system with modulated light, wherein the modulated light is a light of which a light amount changes in relation to time;
a light receiving unit that receives light exiting the optical system in response to an incidence of the modulated light from the modulated light irradiation unit;
a shutter provided between the optical system and the light receiving unit; and
a controlling unit that controls the modulated light irradiation unit, the light receiving unit, and the shutter wherein
while a light beam incident on the light receiving unit after traveling through an optical path exceeding a reference distance determined on a basis of a designed optical path length of the optical system is defined as a disturbance light component, the controlling unit controls opening and closing of the shutter in such a manner that the shutter is open only during such a time period when the disturbance light component out of the light exiting the optical system does not reach the shutter.

13. A disturbance light identifying method comprising:
a step of irradiating, with a modulated light irradiation unit, an optical system with modulated light, wherein the modulated light irradiation unit is a light source, and wherein the modulated light is a light of which a light amount changes in relation to time;
a step of obtaining information about a light beam traveling distance from light exiting the optical system in response to an incidence of the modulated light; and
a step of identifying, while a light beam incident on a light receiving unit after traveling through an optical path exceeding a reference distance determined on a basis of a designed optical path length of the optical system is defined as a disturbance light component, whether or not the light exiting the optical system contains the disturbance light component, on a basis of the light beam traveling distance obtained from the light exiting the optical system.

14. A disturbance light separating method comprising:
- a step of irradiating, with a modulated light irradiation unit, an optical system with modulated light, wherein the modulated light irradiation unit is a light source, and wherein the modulated light is a light of which a light amount changes in relation to time;
- a step of obtaining information about a light beam traveling distance from light exiting the optical system in response to an incidence of the modulated light; and
- a step of generating disturbance light component separation information, while a light beam incident on a light receiving unit after traveling through an optical path exceeding a reference distance determined on a basis of a designed optical path length of the optical system is defined as a disturbance light component, the disturbance light component separation information being used for separating the disturbance light component from the light exiting the optical system, on a basis of the light beam traveling distance obtained from the light exiting the optical system.

* * * * *